(12) United States Patent
Jung et al.

(10) Patent No.: US 12,525,184 B2
(45) Date of Patent: Jan. 13, 2026

(54) DISPLAY DEVICE

(71) Applicant: Samsung Display Co., LTD., Yongin-si (KR)

(72) Inventors: Ji Won Jung, Yongin-si (KR); Guanghai Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 97 days.

(21) Appl. No.: 18/634,742

(22) Filed: Apr. 12, 2024

(65) Prior Publication Data

US 2025/0037653 A1 Jan. 30, 2025

(30) Foreign Application Priority Data

Jul. 26, 2023 (KR) .................. 10-2023-0097268

(51) Int. Cl.
 *G09G 3/3233* (2016.01)
 *G02B 27/01* (2006.01)
 *G09G 3/00* (2006.01)

(52) U.S. Cl.
 CPC ....... *G09G 3/3233* (2013.01); *G02B 27/0172* (2013.01); *G09G 3/003* (2013.01); *G02B 2027/0174* (2013.01); *G02B 2027/0178* (2013.01); *G09G 2300/0819* (2013.01); *G09G 2300/0842* (2013.01); *G09G 2300/0861* (2013.01); *G09G 2310/08* (2013.01)

(58) Field of Classification Search
 CPC .............. G09G 3/3233; G09G 3/003; G09G 2300/0819; G09G 2300/0842; G09G 2300/0861; G09G 2310/08; G02B 27/0172; G02B 2027/0174; G02B 2027/0178
 See application file for complete search history.

(56) References Cited

U.S. PATENT DOCUMENTS

| | | | |
|---|---|---|---|
| 8,400,695 B2* | 3/2013 | Kroll | G03H 1/2294 359/9 |
| 11,181,815 B1* | 11/2021 | Wheelwright | G02B 27/0093 |
| 2019/0188449 A1* | 6/2019 | Zhang | A47B 61/00 |
| 2019/0294109 A1* | 9/2019 | Lee | G03H 1/2294 |
| 2022/0308526 A1* | 9/2022 | Yu | G03H 1/2294 |
| 2024/0411133 A1* | 12/2024 | Jung | G02B 27/0172 |
| 2024/0411269 A1* | 12/2024 | Jung | G02F 1/133601 |
| 2024/0414313 A1* | 12/2024 | Jung | G09G 3/18 |

FOREIGN PATENT DOCUMENTS

KR 1020150029363 A 3/2015

* cited by examiner

*Primary Examiner* — Dmitriy Bolotin
(74) *Attorney, Agent, or Firm* — CANTOR COLBURN LLP

(57) ABSTRACT

The present disclosure relates to a display device. The display device includes at least one spatial light modulator displaying an extended reality content image, a surface light source device providing image display light from the rear direction of the at least one spatial light modulator to the spatial light modulator as background light, and at least one image transmission member forming a display path of the extended reality content image. The surface light source device includes an organic light emitting display unit including a plurality of light emitting pixels performing a surface emission. The surface light source device includes an emission driving circuit supplying an emission control voltage and each of scan timing control signals to the plurality of light emitting pixels to control a light emitting operation of the plurality of light emitting pixels.

20 Claims, 18 Drawing Sheets

DISPLAY DEVICE

CROSS-REFERENCE TO RELATED APPLICATION

This application claims priority to Korean Patent Application No. 10-2023-0097268, filed on Jul. 26, 2023, and all the benefits accruing therefrom under 35 U.S.C. § 119, the content of which in its entirety is herein incorporated by reference.

BACKGROUND

1. Field

The present disclosure relates to a display device.

2. Description of the Related Art

With the development of electronic devices and display devices that can implement virtual reality (VR), technologies that can realize extended reality content image such as, for example, augmented reality (AR), mixed reality (MR), and extended holographic images have been researched as a next step of virtual reality.

Unlike virtual reality that is based on a completely virtual world, augmented reality is a display technology that may further increase the effect of reality by superimposing virtual objects or image information on a real-world environment. In some cases, stereoscopic imaging technology using a hologram method and the likes can fundamentally avoid fatigue that occurs in a conventional stereoscopic method in which stereoscopic images are seen using binocular disparity. Therefore, stereoscopic imaging technology using the hologram method is drawing attention as a next-generation stereoscopic imaging technology to ultimately be reached.

In the case of an extended reality content image such as, for example, a holographic image, since an actual image formed is directly seen with the eyes without using an optical illusion, a 3D effect may be experienced by a user in which the user feels no different compared to seeing a corresponding real object or environment. Therefore, the holographic image may provide advantages in that watching the holographic image for an extended period of time does not cause fatigue.

Some methods of displaying extended reality content images such as, for example, a hologram may employ a spatial light modulator, and in some cases, the performance of the spatial light modulator may serve as a factor that determines the performance and three-dimensional effect. Recently, a liquid crystal display panel has been used as a spatial light modulator. Accordingly, the light emitting structure of a light emitting panel used as a background light source such as, for example, a backlight may serve as a factor in determining the display quality and viewing angle of an extended reality content image.

SUMMARY

Aspects of the present disclosure provide a display device capable of improving the light emitting pixel arrangement structure and surface light emission driving method of a surface light source device used as a backlight of a spatial light modulator. In some aspects, the display device is capable of displaying extended reality content images such as, for example, holograms using an ultra-low resolution surface light source.

Aspects of the present disclosure also provide a display device capable of controlling the light emitting operation of light emitting pixels for each emission area to correspond to the displayed image.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an embodiment of the disclosure, a display device including at least one spatial light modulator displaying an extended reality content image, a surface light source device providing image display light from the rear direction of the at least one spatial light modulator to the at least one spatial light modulator as background light, and at least one image transmission member forming a display path of the extended reality content image, wherein the surface light source device includes an organic light emitting display unit including a plurality of light emitting pixels performing a surface emission, and an emission driving circuit supplying emission control voltage and each of scan timing control signals to the plurality of light emitting pixels to control a light emitting operation of the plurality of light emitting pixels.

In an embodiment, the plurality of light emitting pixels include a plurality of pixel drivers receiving scan timing control signals according to the same timing and light emitting elements emitting light based on one or more driving currents by at least one pixel driver among the plurality of pixel drivers, wherein the plurality of pixel drivers receives the scan timing control signals and the emission control voltage according to the same timing such that the light emitting elements emit light simultaneously.

In an embodiment, the light emitting elements are formed on the organic light emitting display surface in one or more of a sector shape, a triangular shape, a rhombus shape, a quadrangular shape, a circular shape, a semicircular shape, and an elliptical shape.

According to an embodiment of the disclosure, a display device including at least one spatial light modulator displaying an extended reality content image, a surface light source device providing image display light from the rear direction of the at least one spatial light modulator to the spatial light modulator as background light, and at least one image transmission member forming a display path of the extended reality content image. The surface light source device includes an organic light emitting display unit including a plurality of light emitting pixels performing a surface light emission. The surface light source device includes an emission driving circuit controlling light emitting operation of the plurality of light emitting pixels by supplying an emission control voltage and each of scan timing control signals to the plurality of light emitting pixels, wherein the emission driving circuit supplies the scan timing control signals and the emission control voltage according to a same timing to the plurality of light emitting pixels such that the plurality of light emitting pixels is driven according to a same timing in at least one frame unit.

According to an embodiment supported by aspects of the present disclosure, a display device may improves the light emitting pixel arrangement structure and surface light emission driving method of the surface light source device to provide ultra-low resolution background light to the spatial light modulator, thereby improving the driving efficiency and manufacturing efficiency of the display device that displays extended reality content images such as, for example, holograms.

According to an embodiment supported by aspects of the present disclosure, a display device may control the light emitting operation of the light emitting pixels for each emission area of the surface light source device to increase the three-dimensional effect of extended reality content images such as, for example, holograms and reduce power consumption.

However, the effects of the disclosure are not limited to the aforementioned effects, and various other effects are included in the present disclosure.

BRIEF DESCRIPTION OF THE DRAWINGS

The above and other aspects and features of the disclosure will become more apparent by describing in detail embodiments thereof with reference to the attached drawings, in which.

DETAILED DESCRIPTION

The present disclosure will now be described more fully hereinafter with reference to the accompanying drawings, in which preferred embodiments of the disclosure are shown. This disclosure may, however, be embodied in different forms and should not be construed as limited to the embodiments set forth herein. Rather, these embodiments are provided such that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," and the like may be used herein to describe various elements, these elements should not be limited by these terms. These terms are used to distinguish one element from another element. For instance, a first element discussed below could be termed a second element without departing from the teachings of the present disclosure. Similarly, the second element could also be termed the first element. The terms of a singular form may include plural forms unless otherwise specified.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments will be described in detail with reference to the accompanying drawings.

Figure 1:
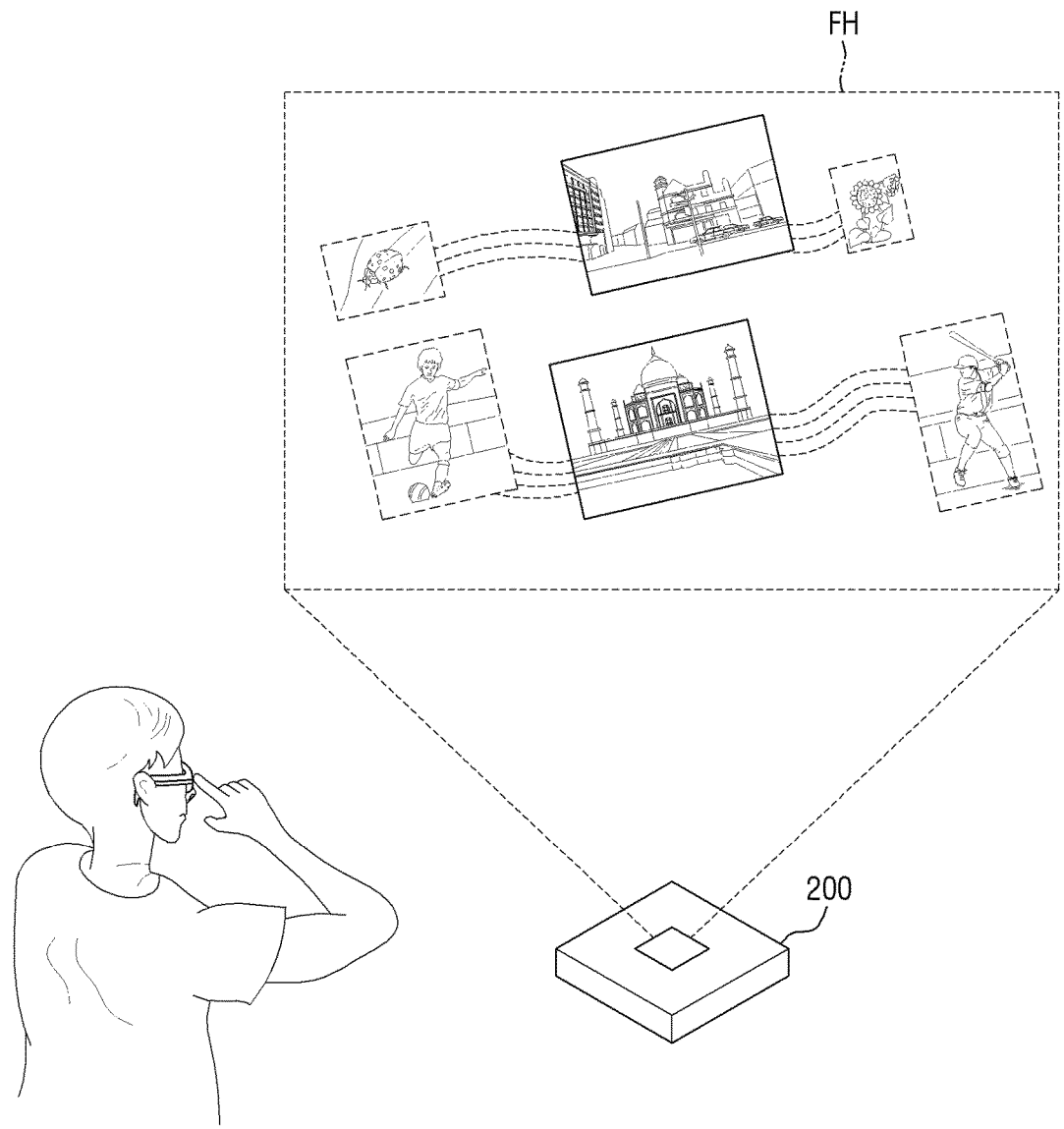
FIG. 1 illustrates a utilization example of a projector-type extended reality content image display device according to an embodiment supported by aspects of the present disclosure.
Figure 2:
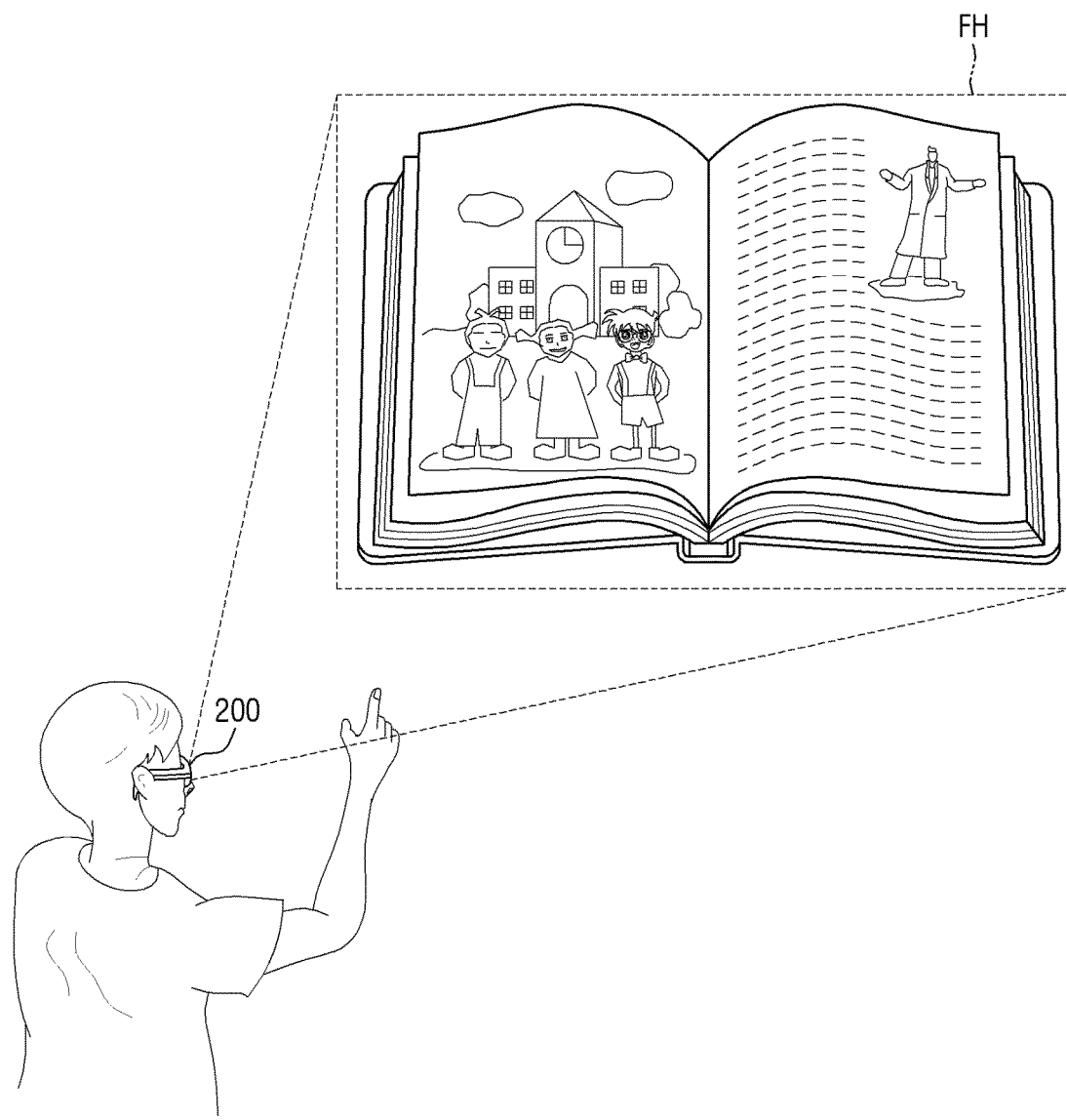
FIG. 2 illustrates a utilization example of a glasses-type extended reality content image display device according to an embodiment supported by aspects of the present disclosure.

FIG. 1 illustrates a utilization example of a projector-type extended reality content image display device according to an embodiment supported by aspects of the present disclosure. FIG. 2 illustrates a utilization example of a glasses-type extended reality content image display device according to an embodiment supported by aspects of the present disclosure.

Referring to FIGS. 1 and 2, a display device 200 according to an embodiment for displaying an extended reality content image such as, for example, a hologram may be formed as a projector type that can be easily carried by a user and may be mounted or assembled in structures on a ceiling or a wall or in a specific space.

In some aspects, the display device 200 according to the embodiment may be integrally formed with a glasses-type frame that can be easily carried and worn or taken off by a user or may be mounted or assembled in the glasses-type frame.

In the present disclosure, the display device 200 displays and provides an extended reality content image FH in a specific space through a 3D lens or sheet, such that the extended reality content image FH such as, for example, a hologram can be recognized in a real space visible to a user's eyes. The extended reality content image FH may include 2D or 3D extended reality image content, which is a combination of graphic images, camera-photographed images and text images, and sound content.

Figure 3:
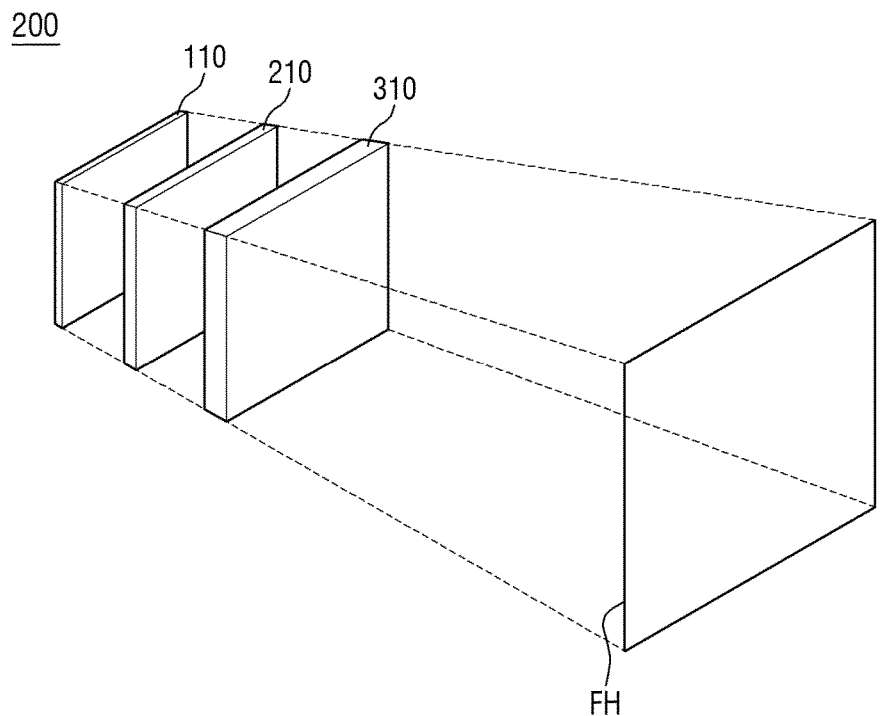
FIG. 3 is an exploded perspective view schematically illustrating the configuration of an extended reality content image display device according to a first embodiment.
Figure 4:
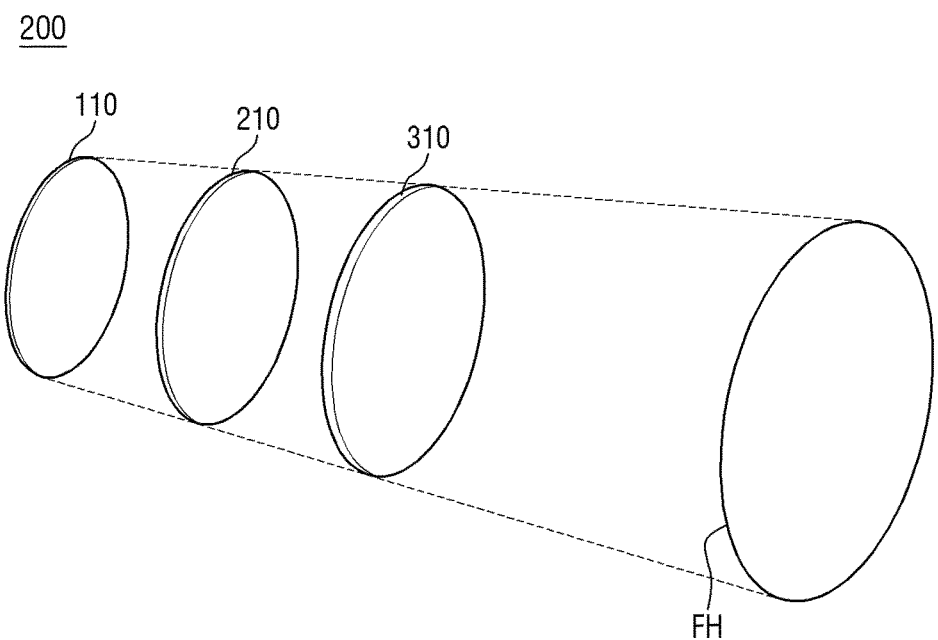
FIG. 4 is an exploded perspective view schematically illustrating the configuration of an extended reality content image display device according to a second embodiment.

FIG. 3 is an exploded perspective view schematically illustrating the configuration of an extended reality content image display device according to a first embodiment. FIG. 4 is an exploded perspective view schematically illustrating the configuration of an extended reality content image display device according to a second embodiment.

Referring to FIGS. 3 and 4, the display device 200 according to the first embodiment for displaying an extended reality content image such as, for example, a hologram may be shaped like a polygonal plane such as, for example, a square or rectangular plane or a quadrangular plate. In some examples, the display device 200 according to the second embodiment may be shaped like a disk or a circular plate with a curved rim such as, for example, a circular or elliptical rim.

A display device 200 shaped like a quadrangular or circular plate includes at least one spatial light modulator 210, at least one surface light source device 110, and at least one image transmission member 310. Here, each of the spatial light modulator 210 and the surface light source device 110 may be a quadrangular or circular plate, shaped according to the planar structure or shape of the display device 200.

The at least one surface light source device 110 is disposed behind the spatial light modulator 210 to provide background light as a backlight to a rear surface of the spatial light modulator 210.

The surface light source device 110 may include an organic light emitting display device (OLED), an inorganic electroluminescent (EL) display device, a quantum dot light emitting display device (QED), a cathode ray tube (CRT) display device, a micro-light emitting diode (LED) display device, or a nano-LED display device.

A case where an organic light emitting display panel is applied as the surface light source device 110 will be described below as an example. However, the surface light source device 110 according to an embodiment is not limited to an organic light emitting display panel or device, and display devices listed herein other display panels or devices or known in the art can also be applied within the scope sharing the technical spirit.

The surface light source device 110 applied as an organic light emitting display panel may be formed to have a different resolution from the at least one spatial light modulator 210. In particular, the surface light source device 110 may be formed to have a lower resolution than the at least one spatial light modulator 210.

The surface light source device 110 receives extended reality content image data from the outside and arranges the extended reality content image data according to a preset first resolution. Then, the extended reality content image data of the first resolution is converted into data analog image signals and displayed on emission areas of an organic light emitting display surface.

The organic light emitting display surface may include emission areas of the surface light source device 110. The extended reality content image display light of the first resolution displayed on the organic light emitting display surface of the surface light source device 110, that is, on the emission areas of the surface light source device 110 is provided to the rear surface of the spatial light modulator 210 as a backlight, that is, background light. The terms "extended reality content image display light," "image display light," and "surface light of the surface light source device 110" may be used interchangeably herein.

The spatial light modulator 210 generates an extended reality content image according to the extended reality content image data from the outside and supplies the extended reality content image to the image transmission member 310 in front of the spatial light modulator 210, such that the extended reality content image is displayed in an image display direction and space of the image transmission member 310.

The spatial light modulator 210 may include a liquid crystal display device (LCD) that displays an extended reality content image of a second resolution on a front surface by using the background light of the first resolution provided from the surface light source device 110 located behind the spatial light modulator 210.

A case where a liquid crystal display panel is applied as the spatial light modulator 210 will be described below as an example. However, embodiments are not limited to a liquid crystal display panel or device, and other display panels listed herein or display devices known in the art can also be applied within the scope sharing the technical spirit.

The spatial light modulator 210 applied as a liquid crystal display panel may be formed to have the same resolution as or a different resolution from the at least one surface light source device 110. However, in an embodiment, the spatial light modulator 210 may be formed to have a higher resolution than the at least one surface light source device 110.

The spatial light modulator 210 receives extended reality content image data input from the outside and arranges the extended reality content image data according to a preset second resolution. The spatial light modulator 210 converts the extended reality content image data of the second resolution into analog image signals and displays the extended reality content image data on an image display surface on which a plurality of pixels are arranged. The second resolution of the spatial light modulator 210 is set to be higher than the first resolution of the surface light source device 110. Accordingly, the spatial light modulator 210 generates an extended reality content image of the second resolution higher than the first resolution by using the background light of the first resolution provided from the at least one surface light source device 110 behind the spatial light modulator 210 and displays the generated extended reality content image on its front surface.

The at least one image transmission member 310 transmits an extended reality content image FH according to a third resolution, in which the background light of the first resolution and the extended reality content image of the second resolution are mixed, through a preset light path to direct and provide the extended reality content image FH in a preset image display direction. Specifically, for example, the image transmission member 310 forms a display path (or light path) of the extended reality content image FH such that the extended reality content image FH of the third resolution can be displayed on a preset space or display surface.

The image transmission member 310 may include at least one optical member from among an optical waveguide (e.g., a prism), a diffusion lens, and a focusing lens. Therefore, the extended reality content image FH displayed through the at least one spatial light modulator 210 is directed to a specific space through the optical waveguide, the diffusion lens, and at least one focusing lens and recognized as the extended reality content image FH of the third resolution in real space. The extended reality content image FH displayed as a hologram type by the image transmission member 310 may include 2D or 3D extended reality image content. In some examples, the 2D or 3D extended reality image content may include a combination of graphic images, camera-photographed images and text images, and sound content.

Figure 5:
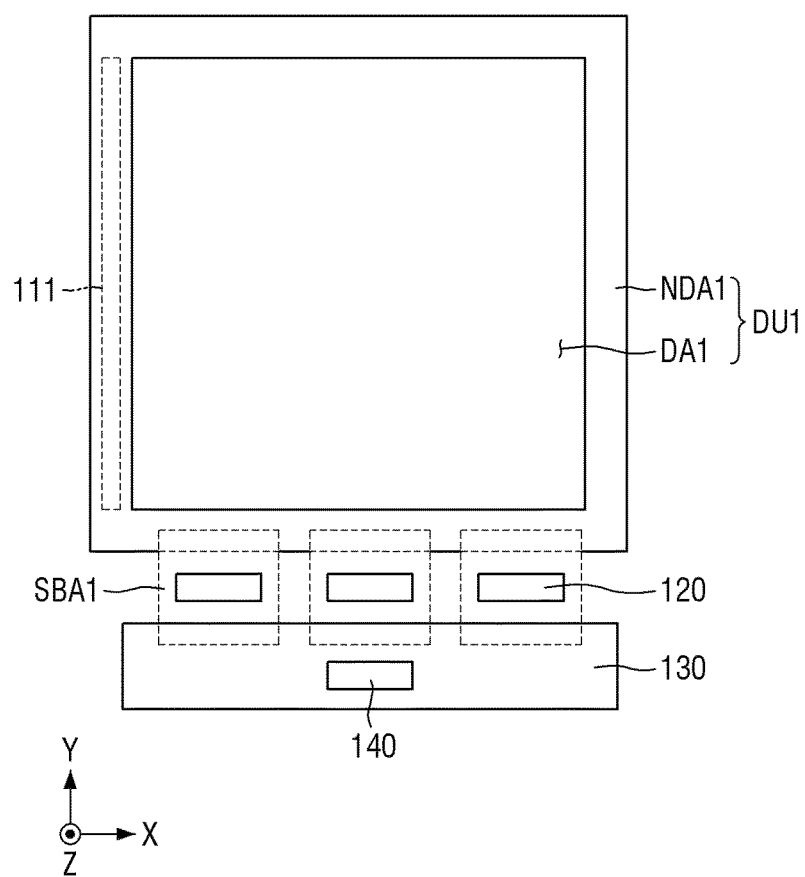
FIG. 5 is a plan view of a first embodiment specifically illustrating a surface light source device illustrated in FIG. 3.
Figure 6:
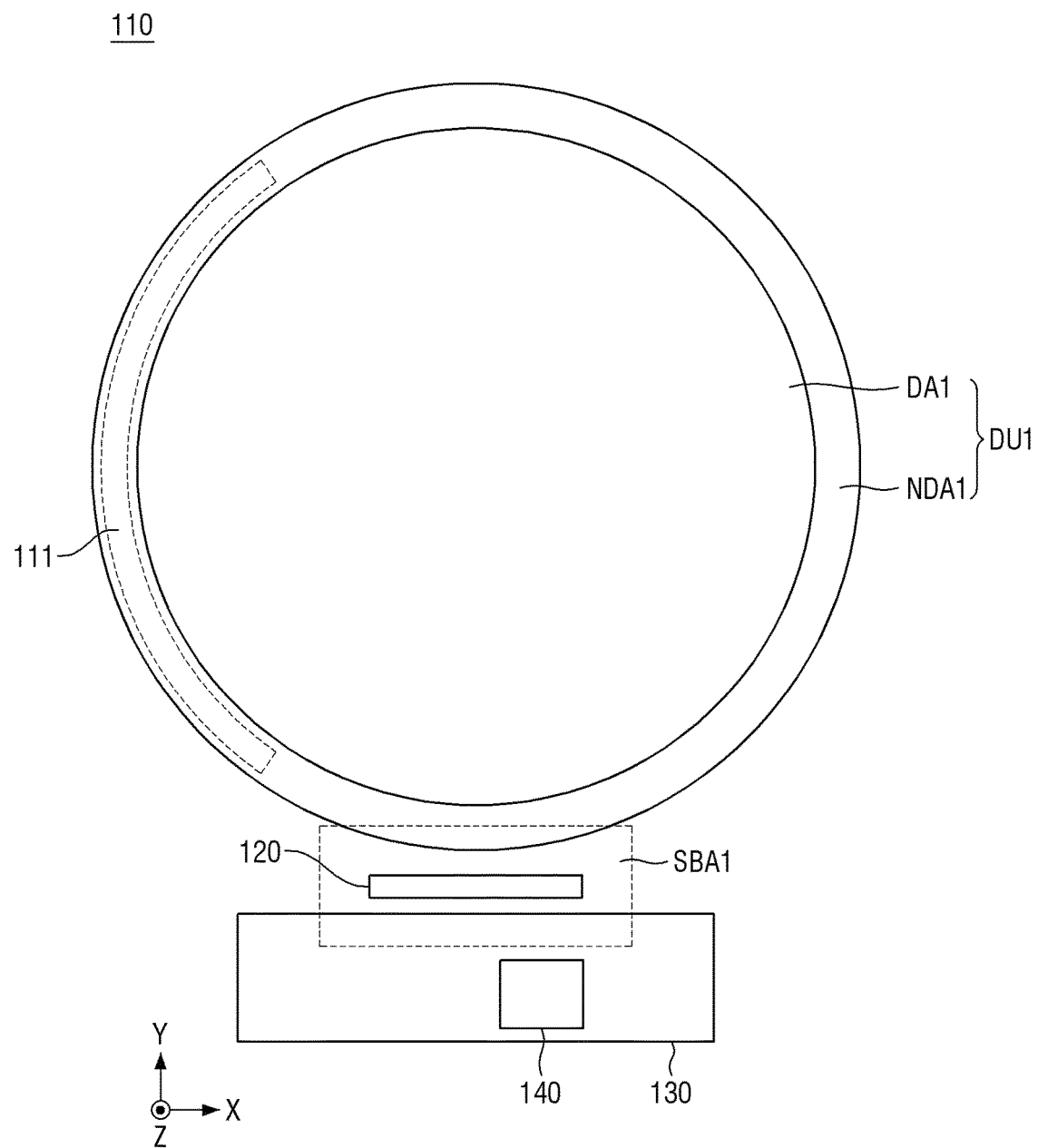
FIG. 6 is a plan view of a first embodiment specifically illustrating a surface light source device illustrated in FIG. 4.

FIG. 5 is a plan view of a first embodiment specifically illustrating a surface light source device 110 illustrated in FIG. 3. FIG. 6 is a plan view of a first embodiment specifically illustrating a surface light source device 110 illustrated in FIG. 4.

Referring to FIGS. 5 and 6, at least one surface light source device 110 is formed to serve as a light source that provides background light to the rear surface of at least one spatial light modulator 210.

The surface light source device 110 may have a rectangular shape, a square shape, a circular shape, an elliptical shape, or a quadrilateral shape in a plan view. For example, the spatial light modulator 210 may be formed in a circular shape in a plan view, and the surface light source device 110 may have a circular shape corresponding to the circular shape of the spatial light modulator 210 in the plan view. However, embodiments are not limited thereto, and the surface light source device 110 and the spatial light modulator 210 may be formed in a rectangular shape with long sides extending in a first direction (e.g., in a horizontal direction) and short sides extending in a second direction (e.g., in a vertical direction).

Referring to FIG. 5, the at least one surface light source device 110 includes a surface light emitting unit DU1 which displays background light as a surface light source, an emission driving circuit 120 which drives light emitting pixels of the surface light emitting unit DU1, and a first data processor 140 which supplies extended reality content image data of a first resolution to the emission driving circuit 120.

Specifically, for example, the at least one surface light source device 110 includes the surface light emitting unit DU1 which displays background light as a surface light source. Here, the surface light emitting unit DU1 may include a plurality of light emitting pixels and may emit background light, which is a surface light source, through the light emitting pixels. The light emitting pixels in the surface light emitting unit DU1 are formed and arranged to correspond to the preset first resolution.

The first data processor 140 extracts extended reality content image data of the first resolution from extended reality content image data input from the outside. Additionally, or alternatively, the first data processor 140 may convert the extended reality content image data input from the outside into the extended reality content image data of the preset first resolution. The first data processor 140 transmits the extended reality content image data of the first resolution to the emission driving circuit 120 of the surface light source device 110.

The emission driving circuit 120 may output data signals and voltages for driving the light emitting pixels of the surface light emitting unit DU1. Specifically, for example, the emission driving circuit 120 receives extended reality content image data from the first data processor 140 such as, for example, a graphic card and arranges the extended reality content image data according to the preset first resolution. Then, the emission driving circuit 120 may convert the extended reality content image data of the first resolution into analog emission signals (or analog emission control signals) and supply the analog emission signals to the light emitting pixels arranged on an organic light emitting display surface DA1 of the surface light emitting unit DU1.

Figure 7:
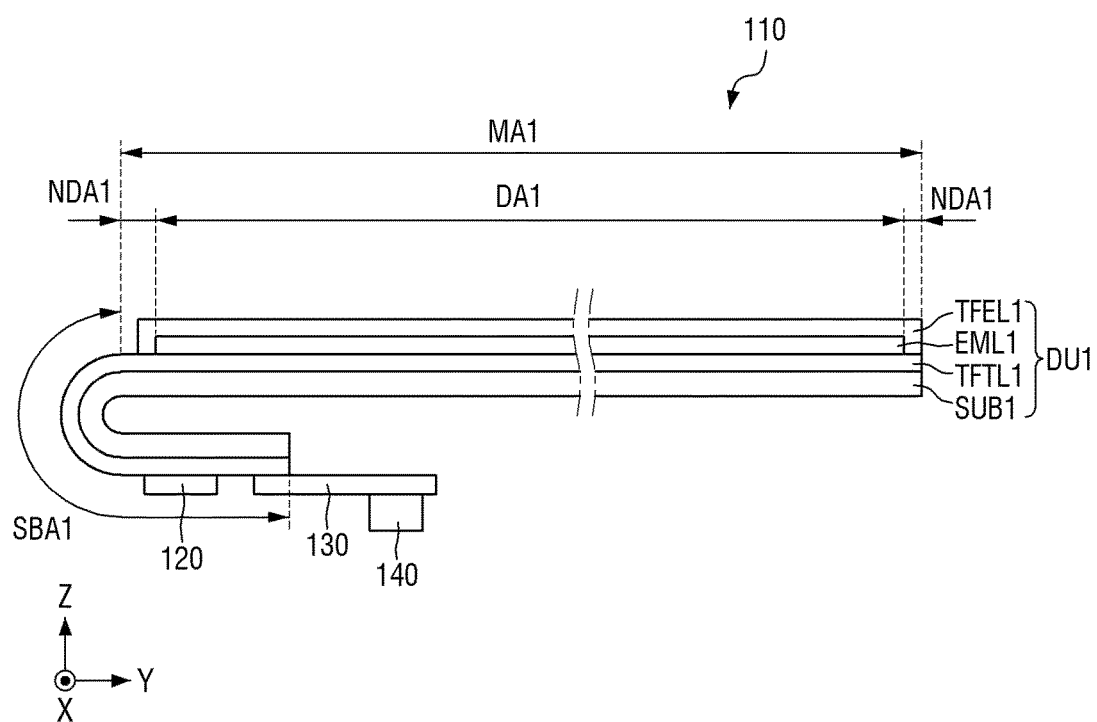
FIG. 7 is a side cross-sectional view illustrating the cross-sectional structure of the surface light source device illustrated in FIGS. 4 and 5.

FIG. 7 is a side cross-sectional view illustrating the cross-sectional structure of the surface light source device illustrated in FIGS. 4 and 5.

Referring to FIGS. 6 and 7, the surface light emitting unit DU1 may be divided into a first main area MA1 and a first sub-area SBA1. The first main area MA1 may include the organic light emitting display surface DA1 on which a plurality of light emitting pixels performing surface emission are arranged and a first non-display area NDA1 disposed around the organic light emitting display surface DA1. The term "performing surface emission" may include emitting light at the first main area MA1 of the light emitting display surface DA1.

Light emitted from respective emission areas or opening areas of the light emitting pixels may be displayed on the organic light emitting display surface DA1 as background light. The light emitting pixels of the organic light emitting display surface DA1 may include pixel drivers including switching elements, a pixel defining layer defining the emission areas or the opening areas, and self-light emitting elements.

The first non-display area NDA1 may be an area outside the organic light emitting display surface DA1. The first non-display area NDA1 may be defined as an edge area of the first main area MA1. The first non-display area NDA1 may include a gate driver 111 supplying gate signals to gate lines (not illustrated) and fan-out lines (not illustrated) connecting the emission driving circuit 120 and the organic light emitting display surface DA1.

The first sub-area SBA1 may extend from a side of the first main area MA1. The first sub-area SBA1 may include a flexible material that can be bent, folded, or rolled. For example, when the first sub-area SBA1 is bent, it may overlap the first main area MA1 in a thickness direction (Z-axis direction). The first sub-area SBA1 may include the emission driving circuit 120 and a pad unit connected to a first circuit board 130. Optionally, the first sub-area SBA1 may be omitted, and the emission driving circuit 120 and the pad unit may be disposed in the first non-display area NDA1.

At least one emission driving circuit 120 may be formed as an integrated circuit and mounted in the first non-display area NDA1 by a chip on glass (COG) method, a chip on plastic (COP) method, or an ultrasonic bonding method. For example, the emission driving circuit 120 may be disposed in the first sub-area SBA1 and may be overlapped by the first main area MA1 in the thickness direction (Z-axis direction) by the bending of the first sub-area SBA1. In another example, the emission driving circuit 120 may be mounted on the first circuit board 130.

The first circuit board 130 may be attached onto the pad unit of the first non-display area NDA1 using an anisotropic conductive film (ACF). Lead lines of the first circuit board 130 may be electrically connected to the pad unit of the first non-display area NDA1. The first circuit board 130 may be a flexible printed circuit board, a printed circuit board, or a flexible film such as, for example, a chip on film.

A first substrate SUB1 of the surface light emitting unit DU1 illustrated in FIG. 7 may be a base substrate or a base member. The first substrate SUB1 may be a flexible substrate that can be bent, folded, or rolled. For example, the first substrate SUB1 may include a glass material or a metal material. However, embodiments are not limited thereto. In another example, the first substrate SUB1 may include polymer resin such as, for example, polyimide (PI).

A first thin-film transistor layer TFTL1 may be disposed on the first substrate SUB1. The first thin-film transistor layer TFTL1 may include a plurality of thin-film transistors constituting pixel drivers of light emitting pixels. The first thin-film transistor layer TFTL1 may further include gate lines, data lines, power lines, gate control lines, fan-out lines connecting the emission driving circuit 120 and the data lines, and lead lines connecting the emission driving circuit 120 and the pad unit. When a first gate driver 111 is formed on a side of the first non-display area NDA1 of the surface light emitting unit DU1, it may also include thin-film transistors.

The first thin-film transistor layer TFTL1 may be disposed on the organic light emitting display surface DA1, the first non-display area NDA1, and the first sub-area SBA1. The thin-film transistors of the pixels, the gate lines, the data lines, and the power lines of the first thin-film transistor layer TFTL1 may be disposed on the organic light emitting display surface DA1. The gate control lines and the fan-out lines of the first thin-film transistor layer TFTL1 may be disposed in the first non-display area NDA1. The lead lines of the first thin-film transistor layer TFTL1 may be disposed in the first sub-area SBA1.

A first light emitting element layer EML1 may be disposed on the first thin-film transistor layer TFTL1. The first light emitting element layer EML1 may include a plurality of light emitting elements, each including a first electrode, a light emitting layer and a second electrode sequentially stacked to emit light, and a pixel defining layer defining the pixels. The light emitting elements of the first light emitting element layer EML1 may be disposed on the organic light emitting display surface DA1.

A first encapsulation layer TFEL1 may cover upper and side surfaces of the first light emitting element layer EML1 and may protect the first light emitting element layer EML1. The first encapsulation layer TFEL1 may include at least one inorganic layer and at least one organic layer to encapsulate the first light emitting element layer EML1.

Figure 8:
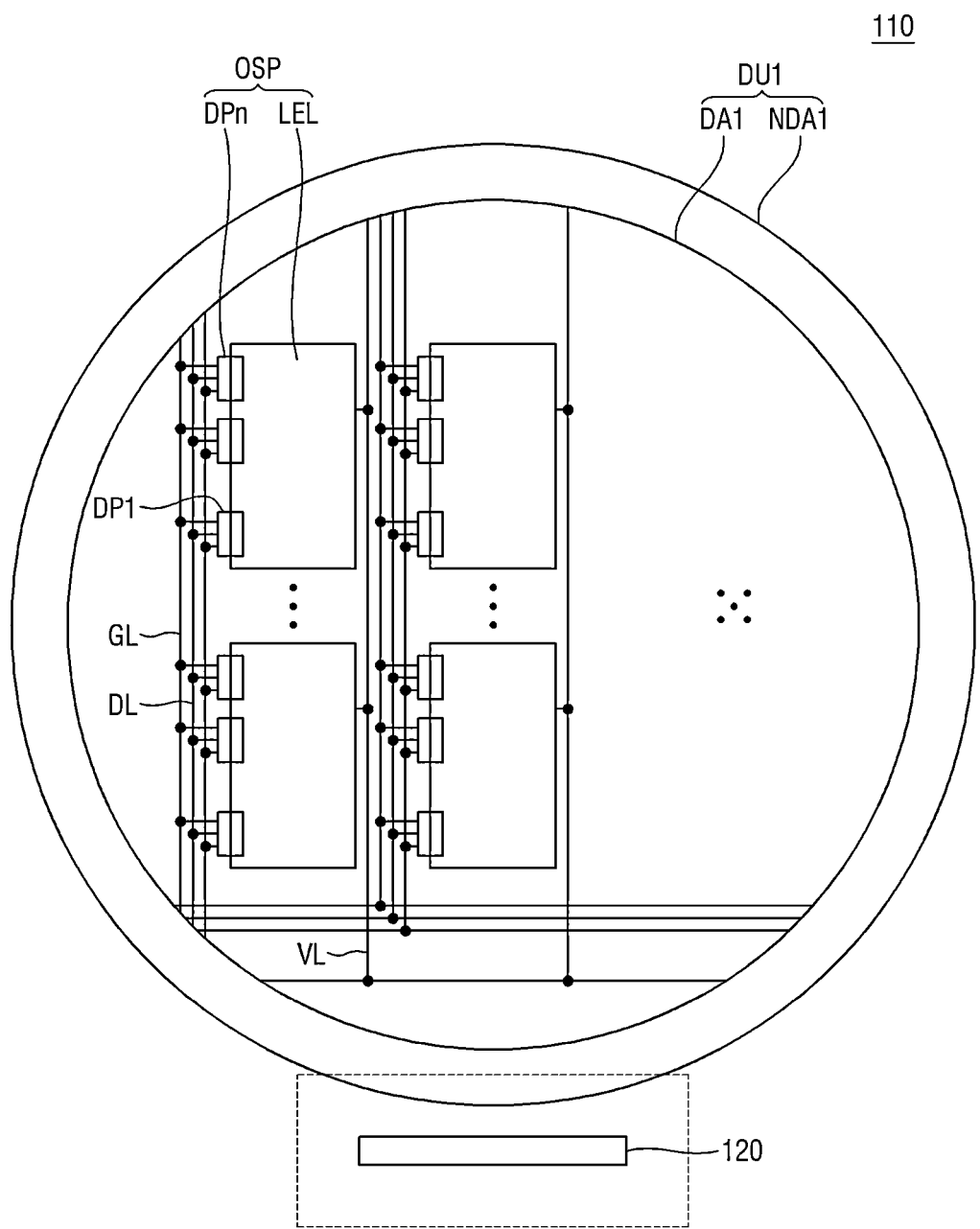
FIG. 8 is a plan view schematically illustrating the structure of the organic light emitting display surface of the surface light source device illustrated in FIGS. 4 and 5.

FIG. 8 is a plan view schematically illustrating the structure of the organic light emitting display surface of the surface light source device 110 illustrated in FIGS. 4 and 5.

Referring to FIG. 8, the organic light emitting display surface DA1 of the surface light emitting unit DU1 is an area that displays background light through surface light emission and may be defined as a central area of the surface light emitting unit DU1. The organic light emitting display surface DA1 may include a plurality of light emitting pixels OSP, a plurality of gate lines GL, a plurality of data lines DL, and a plurality of power lines VL. Each of the light emitting pixels OSP may be defined as a minimum unit that emits light. The plurality of gate lines GL may include at least one of a display initialization line, a display scan line, and a display control line.

The plurality of gate lines GL may supply a plurality of scan control signals received from the first gate driver 111 to the light emitting pixels OSP. Each of the gate lines GL (scan lines) may extend in X-axis and Y-axis directions based on the arrangement direction and planar shape of the light emitting pixels OSP and may be disposed in the X-axis or Y-axis direction around the light emitting pixels OSP.

The data lines DL may supply emission control voltages received from the emission driving circuit 120 to the light emitting pixels OSP. The data lines DL may extend in the X-axis and Y-axis directions based on the arrangement direction and planar shape of the light emitting pixels OSP and may be disposed in the X-axis or Y-axis direction around the light emitting pixels OSP.

The power lines VL may supply each power supply voltage received from the emission driving circuit 120 or a separate power supply unit to the light emitting pixels OSP. Here, the power supply voltages may be at least one of a high-potential driving voltage, a low-potential ground voltage, and a reference voltage. The power lines VL may extend in the X-axis and Y-axis directions based on the arrangement direction and planar shape of the light emitting pixels OSP and may be disposed in the X-axis or Y-axis direction around the light emitting pixels OSP. Descriptions of elements (e.g., gate lines GL, data lines DL, power lines VL) being disposed in the X-axis or Y-axis direction around the light emitting pixels OSP may include the elements being disposed above or below (in the Y-axis direction) the light emitting pixels OSP and/or to the side (in the X-axis direction) the light emitting pixels OSP.

The first non-display area NDA1 may include the first gate driver 111, fan-out lines (not illustrated), and gate control lines (not illustrated). The first gate driver 111 may generate gate signals based on a gate control signal in units of at least one frame period and may simultaneously supply the gate signals to the plurality of gate lines (scan lines) in units of at least one frame period.

The fan-out lines may extend from the emission driving circuit 120 to the organic light emitting display surface DA1. The fan-out lines may simultaneously receive emission control voltages from the emission driving circuit 120 and supply the emission control voltages to the data lines DL in units of at least one frame period.

The first gate control lines may extend from the emission driving circuit 120 to the first gate driver 111. The first gate control lines may supply gate control signals received from the emission driving circuit 120 to the first gate driver 111.

The emission driving circuit 120 supplies gate control signals to the first gate driver 111 through the gate control lines. Accordingly, for example, the first gate driver 111 supplies a plurality of scan control signals (e.g., based on the gate control signals) for simultaneously driving the light emitting pixels OSP to the light emitting pixels OSP. Here, the emission driving circuit 120 may output, to the fan-out lines, analog emission control voltages for simultaneously driving the light emitting pixels OSP. The analog emission control voltages may be supplied to the light emitting pixels OSP, and luminances of the light emitting pixels OSP may be based on the analog emission control voltages.

Figure 9:
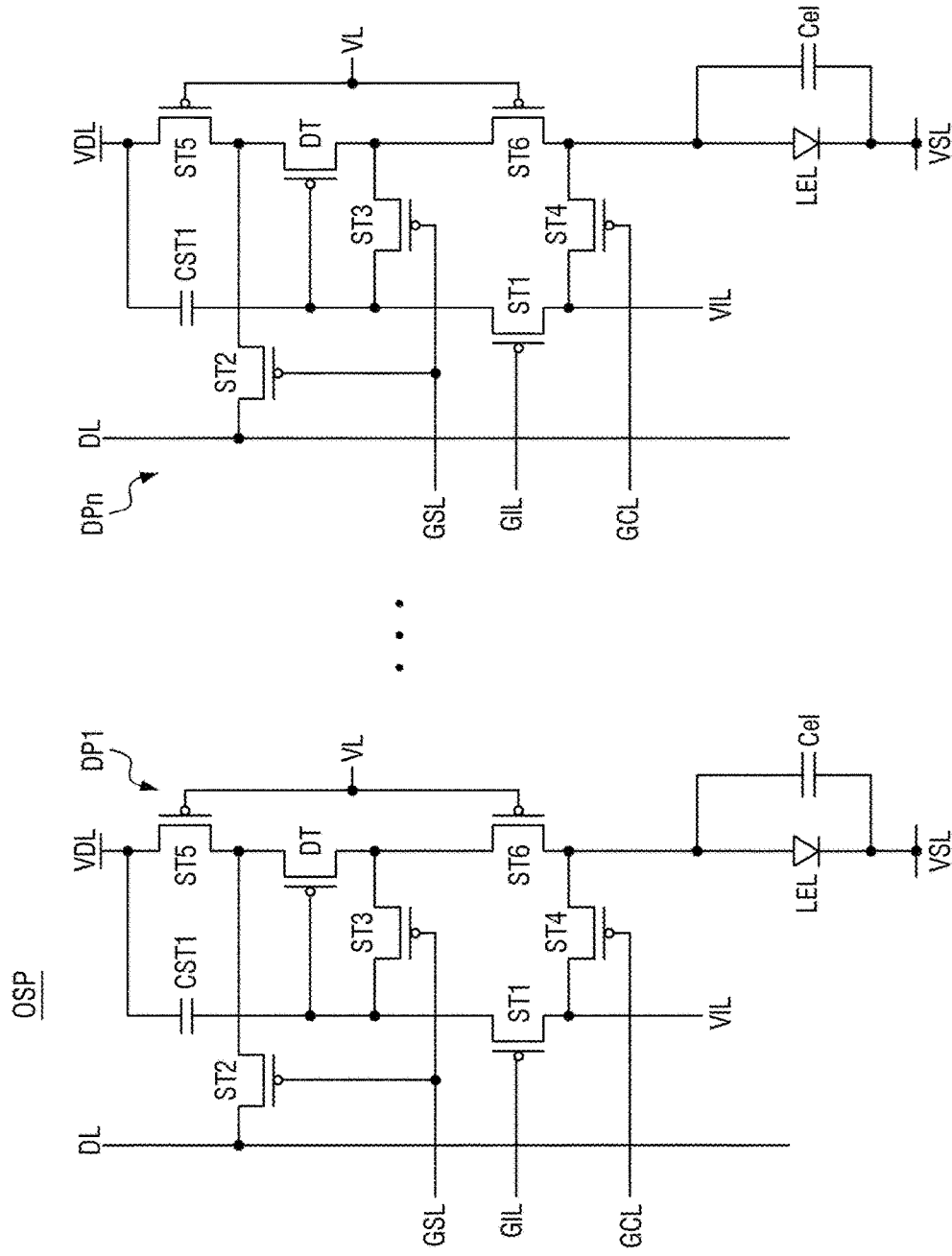
FIG. 9 is a circuit diagram illustrating the circuit structure of a light emitting pixel according to a first embodiment supported by aspects of the present disclosure.

FIG. 9 is a circuit diagram illustrating the circuit structure of a light emitting pixel OSP according to a first embodiment supported by aspects of the present disclosure.

Referring to FIG. 9 together with FIG. 8, each of the light emitting pixels OSP arranged on the organic light emitting display surface DA1 includes a light emitting element LEL and at least one of pixel drivers DP1 through DPn.

Each of the light emitting elements LEL may be connected in parallel to at least one of the pixel drivers DP1 through DPn. Each of the light emitting elements LEL may emit light in response to driving currents simultaneously input from the pixel drivers DP1 through DPn. For example, each light emitting element LEL may emit light in response to driving currents simultaneously input from a respective pixel driver (e.g., pixel driver DP1, pixel driver DPn)

electrically coupled to the light emitting element LEL. The term "connected to" expressed herein may refer to electrical and/or physical coupling between elements.

The pixel drivers DP1 through DPn receive the same scan timing control signals and analog emission control voltages through the emission driving circuit 120 and the first gate driver 111, and the pixel drivers DP1 through DPn may drive the light emitting element LEL connected in parallel thereto according to the same driving timing in units of at least one frame. The scan timing control signals may include a display initialization signal, a display scan signal, an emission control signal, and a display control signal.

Specifically, for example, the light emitting pixels OSP are disposed at ultra-low resolution. For example, the light emitting pixels OSP may be formed and disposed on the organic light emitting display surface DA1 in units of at least three. In other words, the light emitting pixels OSP may be formed and disposed on the organic light emitting display surface DA1 in units of at least three, and the number of light emitting pixels OSP disposed on the organic light emitting display surface DA1 may be a multiple of 3 (e.g., 3, 6, 9, 12, 15, . . . ).

The planar area of the light emitting element LEL of each light emitting pixel OSP is inversely proportional to the number of resolutions (or the number of light emitting elements). That is, the planar area of each light emitting element LEL may be inversely proportional to the resolution at which the light emitting elements LEL are disposed, such that the lower the resolution, the wider the planar area of each light emitting element LEL can be formed. In some aspects, the resolution of a given light emitting element LEL is lower as the width of the planar area of the light emitting element LEL increases. Here, since a resistance-capacitance (RC) value of each light emitting element LEL increases as the planar area of each light emitting element LEL increases, the systems and techniques described herein include may include connecting a plurality of pixel drivers DP1 through DPn to each light emitting element LEL to prevent a reduction in the amount of light emitted from each light emitting element LEL. Accordingly, for example, the pixel drivers DP1 through DPn of each light emitting pixel OSP may receive scan timing control signals and an analog emission control voltage according to the same timing and drive the light emitting element LEL according to the same driving timing. Expressed another way, the pixel drivers DP1 through DPn of each light emitting pixel OSP may receive scan timing control signals and an analog emission control voltage according to the same timing and drive the light emitting element LEL based on the scan timing control signals and the analog emission control voltage.

Referring to FIG. 9, each of the pixel drivers DP1 through DPn of each light emitting pixel OSP may be connected to a display initialization line GIL, a display scan line GSL, a display control line GCL, and an emission control line VL.

In some aspects, each of the pixel drivers DP1 through DPn may be connected to a first driving voltage line VDL to which the display device 200 may supply a high-potential first driving voltage, a second driving voltage line VSL to which the display device 200 may supply a low-potential second driving voltage, and a third driving voltage line VIL to which the display device 200 may supply a high-potential third driving voltage. The alphabetic identifiers k and n (or i, j, n) used herein instead of numbers will hereinafter be defined as positive integers excluding zero.

Each of the pixel drivers DP1 through DPn of each light emitting pixel OSP may include a driving transistor DT, switch elements, and a capacitor CST1. In some embodiments, the switch elements include first transistor ST1 through sixth transistor ST6.

The driving transistor DT of each of the pixel drivers DP1 through DPn may include a gate electrode, a first electrode, and a second electrode. The driving transistor DT controls a drain-source current Ids (hereinafter, referred to as a "driving current") flowing between the first electrode and the second electrode based on an analog emission control voltage applied to the gate electrode. The driving current Ids flowing through a channel of the driving transistor DT is proportional to the square of a difference between a voltage Vgs between the first electrode and the gate electrode of the driving transistor DT and a threshold voltage as shown in Equation 1.

$$Ids = k' \times (Vsg - Vth)^2 \quad (1)$$

Referring to Equation 1, k' is a proportional coefficient determined by the structure and physical characteristics of a driving transistor (e.g., driving transistor DT), Vsg is a voltage between the first electrode and the gate electrode of the driving transistor, and Vth is a threshold voltage of the driving transistor.

The light emitting element LEL emits light based on the driving currents Ids simultaneously supplied through at least one of the pixel drivers DP1 through DPn. For example, for a case in which the display device 200 simultaneously supplies driving currents Ids to pixel driver DP1 through pixel driver DPn of the light emitting element LEL, the light emitting element LEL emits light based on the driving currents Ids. As the driving currents Ids supplied in parallel from the pixel drivers DP1 through DPn increase, the amount of light emitted from the light emitting element LEL may increase.

The light emitting element LEL may be an organic light emitting diode including an organic light emitting layer disposed between an anode and a cathode. Additionally, or alternatively, the light emitting element LEL may be an inorganic light emitting element including an inorganic semiconductor disposed between the anode and the cathode. Additionally, or alternatively, the light emitting element LEL may be a quantum dot light emitting element including a quantum dot light emitting layer disposed between the anode and the cathode. Additionally, or alternatively, the light emitting element LEL may be a micro-light emitting element including a micro-light emitting diode disposed between the anode and the cathode.

The anode of each light emitting element LEL may be connected to a first electrode of the fourth transistor ST4 and a second electrode of the sixth transistor ST6 of each of the pixel drivers DP1 through DPn, and the cathode of the light emitting element LEL may be connected to the second driving voltage line VSL. In some embodiments, a parasitic capacitance Cel may form between the anode and the cathode of the light emitting element LEL.

The first transistor ST1 is turned on by a scan timing control signal, for example, an initialization scan signal at the display initialization line GIL to connect the gate electrode of the driving transistor DT to the third driving voltage line VIL. For example, in the on state, the first transistor ST1 connects the gate electrode of the driving transistor DT to the third driving voltage line VIL. Accordingly, for example, a third driving voltage VINT at the third driving voltage line VIL may be applied to the gate electrode of the driving transistor DT. The first transistor ST1 may have a gate electrode connected to the display initialization line GIL, a first electrode connected to the gate electrode of the driving transistor DT, and a second electrode connected to the third driving voltage line VIL.

The second transistor ST2 is turned on by a scan timing control signal, for example, a display scan signal at the display scan line GSL to connect the first electrode of the driving transistor DT to a data line DL. For example, in the on state, the second transistor ST2 connects the first electrode of the driving transistor DT to the data line DL. Accordingly, for example, an emission control voltage (or an analog emission control voltage) at the data line DL may be applied to the first electrode of the driving transistor DT. The second transistor ST2 may have a gate electrode connected to the display scan line GSL, a first electrode connected to the first electrode of the driving transistor DT, and a second electrode connected to the data line DL.

The third transistor ST3 is turned on by the display scan signal of the display scan line GSL to connect the gate electrode and the second electrode of the driving transistor DT. For example, in the on state, the third transistor ST3 connects the gate electrode and the second electrode of the driving transistor DT. Accordingly, when the gate electrode and the second electrode of the driving transistor DT are connected, the driving transistor DT operates as a diode. The third transistor ST3 may have a gate electrode connected to the display scan line GSL, a first electrode connected to the second electrode of the driving transistor DT, and a second electrode connected to the gate electrode of the driving transistor DT.

The fourth transistor ST4 is turned on by a scan timing control signal, for example, a display control signal at the display control line GCL to connect the anode of the light emitting element LEL to the third driving voltage line VIL. For example, in the on state, the fourth transistor ST4 connects the anode of the light emitting element LEL to the third driving voltage line VIL. Accordingly, for example, the third driving voltage at the third driving voltage line VIL may be applied to the anode of the light emitting element LEL. The fourth transistor ST4 may have a gate electrode connected to the display control line GCL, the first electrode connected to the anode of the light emitting element LEL, and a second electrode connected to the third driving voltage line VIL.

The fifth transistor ST5 is turned on by a scan timing control signal, for example, an emission control signal at the emission control line VL to connect the first electrode of the driving transistor DT to the first driving voltage line VDL. For example, in the on state, the fifth transistor ST5 connects the first electrode of the driving transistor DT to the first driving voltage line VDL. The fifth transistor ST5 may have a gate electrode connected to the emission control line VL, a first electrode connected to the first driving voltage line VDL, and a second electrode connected to the first electrode of the driving transistor DT.

The sixth transistor ST6 is disposed between the second electrode of the driving transistor DT and the anode of the light emitting element LEL. The sixth transistor ST6 is turned on by the emission control signal at the emission control line VL to connect the second electrode of the driving transistor DT to the anode of the light emitting element LEL. For example, in the on state, the sixth transistor ST6 connects the second electrode of the driving transistor DT to the anode of the light emitting element LEL. The sixth transistor ST6 may have a gate electrode connected to the emission control line VL, a first electrode connected to the second electrode of the driving transistor DT, and the second electrode connected to the anode of the light emitting element LEL.

When both the fifth transistor ST5 and the sixth transistor ST6 are turned on, the driving current Ids of the driving transistor DT corresponding to the analog emission control voltage applied to the gate electrode of the driving transistor DT may flow to the light emitting element LEL.

The capacitor CST1 is formed between the gate electrode of the driving transistor DT and the first driving voltage line VDL. A first capacitor electrode of the capacitor CST1 may be connected to the gate electrode of the driving transistor DT, and a second capacitor electrode of the capacitor CST1 may be connected to the first driving voltage line VDL.

In an example, the respective first electrodes of each of the first through sixth transistors ST1 through ST6 and the driving transistor DT may be source electrodes, and the respective second electrodes may be drain electrodes. Additionally, or alternatively, when the first electrode of each of the first through sixth transistors ST1 through ST6 and the driving transistor DT is a drain electrode, the second electrode may be a source electrode.

An active layer of each of the first through sixth transistors ST1 through ST6 and the driving transistor DT may be formed of any one of polysilicon, amorphous silicon, and an oxide semiconductor. Although a case where the first through sixth transistors ST1 through ST6 and the driving transistor DT are formed as P-type metal oxide semiconductor field effect transistors (MOSFETs) is mainly described in FIG. 9, embodiments are not limited thereto. For example, the first through sixth transistors ST1 through ST6 and the driving transistor DT may also be formed as N-type MOSFETs. Additionally, or alternatively, at least one of the first through sixth transistors ST1 through ST6 may be formed as an N-type MOSFET.

Figure 10:
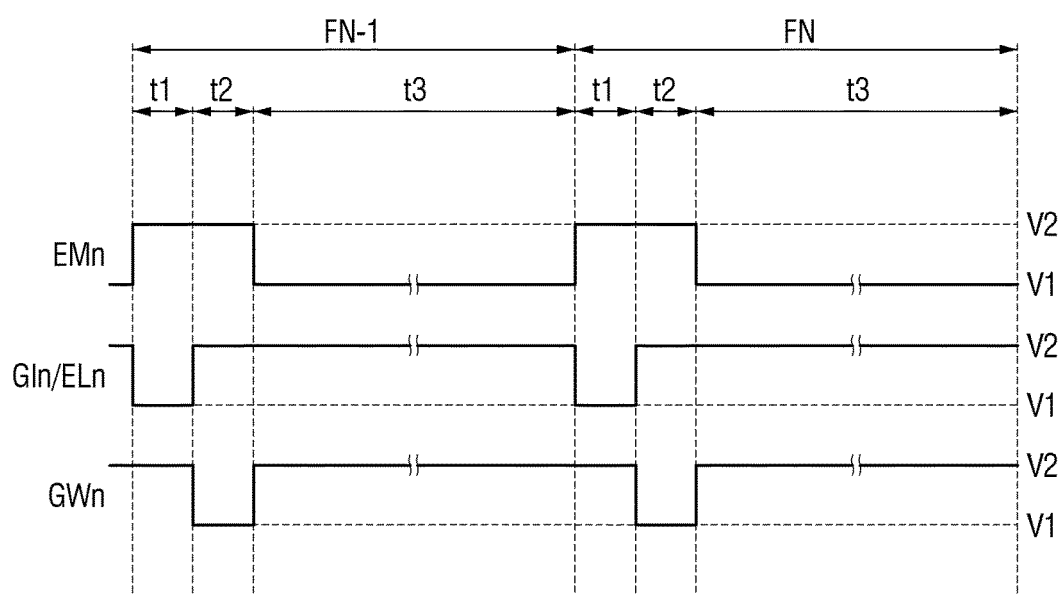
FIG. 10 is a waveform diagram of scan control signals simultaneously supplied to a plurality of light emitting elements shown in FIG. 9.

FIG. 10 is a waveform diagram of scan timing control signals simultaneously supplied to a plurality of light emitting elements LEL shown in FIGS. 8 and 9.

FIG. 10 illustrates examples of the scan timing control signals in accordance with example aspects of the present disclosure. In an example, the scan timing control signals may include an emission control signal EMn transmitted to the emission control line VL during an $(N-1)^{th}$ frame period FN-1 and an $N^{th}$ frame period FN, a display initialization signal GIn transmitted to the display initialization line GIL, a display control signal ELn transmitted to the display control line GCL, and a display scan signal GWn transmitted to a display scan line GSL.

Among the scan timing control signals, the display initialization signal GIn is a signal for controlling on-off of the first transistor ST1 of the pixel drivers DP1 through DPn. The display control signal ELn is a signal for controlling on-off of the fourth transistor ST4 of the pixel drivers DP1 through DPn. Among the scan timing control signals, the display scan signal GWn is a signal for controlling on-off of the second transistor ST2 and the third transistor ST3 of each of the pixel drivers DP1 through DPn. The emission control signal EMn is a signal for controlling on-off of the fifth transistor ST5 and the sixth transistor ST6.

Each of the $(N-1)^{th}$ frame period FN-1 and the $N^{th}$ frame period FN may include a first period t1, a second period t2, and a third period t3.

The first period t1 is a period in which the display device 200 initializes the gate electrode of the driving transistor DT to the third driving voltage, the second period t2 is a period in which the display device 200 supplies an analog emission control voltage to the gate electrode of the driving transistor DT and the threshold voltage of the driving transistor DT is sampled, and the third period t3 is a period in which the light emitting element LEL emits light based on a gate voltage of the driving transistor DT.

The emission control signal EMn is of a first-level voltage V1 during the third period t3 and is of a second-level voltage V2 during the first period t1 and the second period t2. The display scan signal GWn is of the first-level voltage V1 during the second period t2 and is of the second-level voltage V2 during the first period t1 and the third period t3.

The display initialization signal GIn and the display control signal ELn are of the first-level voltage V1 during the first period t1 and are of the second-level voltage V2 during the second period t2 and the third period t3. That is, the display initialization signal GIn and the display control signal ELn may be substantially the same.

The first-level voltage V1 may be a turn-on voltage that can turn on the first through sixth transistors ST1 through ST6. The second-level voltage V2 may be a turn-off voltage that can turn off the first through sixth transistors ST1 through ST6. The second-level voltage V2 may be higher than the first-level voltage V1.

An example of the operation of the light emitting pixel OSP during the first period t1, the second period t2, and the third period t3 will now be described with reference to FIGS. 9 and 10.

First, in the first period t1, the display device 200 may supply the display initialization signal GIn of the first-level voltage V1 to the display initialization line GIL, and the display device 200 may supply the display control signal ELn of the first-level voltage V1 to the display control line GCL.

During the first period t1, the first transistor ST1 is turned on by the display initialization signal GIn of the first-level voltage V1. Due to the turn-on of the first transistor ST1, the third driving voltage of the third driving voltage line VIL is applied to the gate electrode of the driving transistor DT. When the third driving voltage is applied to the gate electrode of the driving transistor DT during the first period t1, the voltage Vsg between the first electrode and the gate electrode of the driving transistor DT is greater than the threshold voltage Vth of the driving transistor DT. Accordingly, for example, the driving transistor DT may turn on based on the voltage Vsg. That is, the display device 200 is capable of applying an on-bias to the driving transistor DT, which may improve hysteresis characteristics of the driving transistor DT.

In some aspects, during the first period t1, the fourth transistor ST4 is turned on by the display control signal ELn of the first-level voltage V1. Due to the turn-on of the fourth transistor ST4 during the first period t1, the anode of the light emitting element LEL may be initialized to the third driving voltage of the third driving voltage line VIL.

Second, the display device 200 may supply the display scan signal GWn of the first-level voltage V1 to the display write line GWL during the second period t2. During the second period t2, each of the second transistor ST2 and the third transistor ST3 is turned on by the display scan signal GWn of the first-level voltage V1.

During the second period t2, the gate electrode and the second electrode of the driving transistor DT are connected to each other due to the turn-on of the third transistor ST3, and the driving transistor DT operates as a diode. In some aspects, due to the turn-on of the second transistor ST2 during the second period t2, an emission control voltage (e.g., an analog emission control voltage) is supplied to the first electrode of the driving transistor DT. In this case, since the voltage (Vsg=Vdata−VINT) between the first electrode and the gate electrode of the driving transistor DT is smaller than the threshold voltage Vth, the driving transistor DT forms a current path until the voltage Vsg between the first electrode and the gate electrode reaches the threshold voltage Vth. Accordingly, for example, during the second period t2, a difference voltage between the gate electrode and the second electrode of the driving transistor DT rises to a difference voltage (Vdata−Vth) between the data voltage Vdata and the threshold voltage Vth of the driving transistor DT.

Third, the display device 200 may supply the emission control signal EMn having the first-level voltage V1 to the emission control line during the third period t3. During the third period t3, each of the fifth transistor ST5 and the sixth transistor ST6 is turned on by the emission control signal EMn having the first-level voltage V1.

Due to the turn-on of the fifth transistor ST5, the first electrode of the driving transistor DT is connected to the first driving voltage line VDL. Due to the turn-on of the sixth transistor ST6, the second electrode of the driving transistor DT is connected to the anode of the light emitting element LEL.

When the fifth transistor ST5 and the sixth transistor ST6 are turned on, the driving current Ids flowing based on the voltage of the gate electrode of the driving transistor DT may be supplied to the light emitting element LEL. The driving current Ids may be defined as in Equation 2.

$$Ids = k' \times \{VDD - (V\text{data} - Vth) - Vth\}^2. \qquad (2)$$

In Equation 2, k' is a proportional coefficient determined by the structure and physical characteristics of the driving transistor DT, Vth is a threshold voltage of the driving transistor DT, VDD is a first driving voltage of the first driving voltage line VDL, and Vdata is an emission control voltage. The voltage of the gate electrode of the driving transistor DT is "Vdata−Vth", and the voltage of the first electrode is VDD. Equation 2 is rearranged into Equation 3.

$$Ids = k' \times (VDD - V\text{data})^2. \qquad (3)$$

Ultimately, the driving current Ids may be independent from the threshold voltage Vth of the driving transistor DT as shown in Equation 3. That is, the display device 200 supports compensating the threshold voltage Vth of the driving transistor DT.

Figure 11:
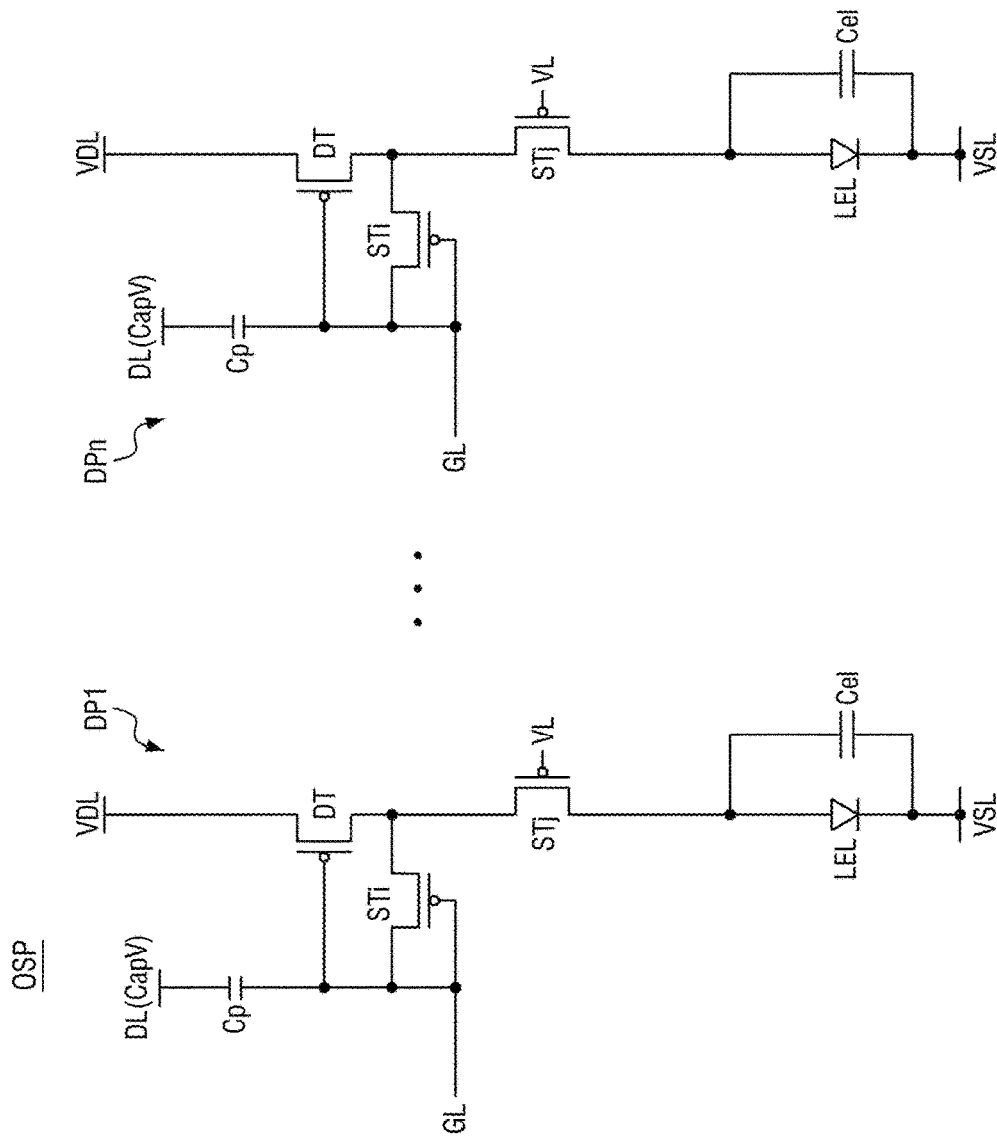
FIG. 11 is a circuit diagram illustrating the circuit structure of a light emitting pixel according to a second embodiment supported by aspects of the present disclosure.

FIG. 11 is a circuit diagram illustrating the circuit structure of a light emitting pixel OSP according to a second embodiment supported by aspects of the present disclosure.

Referring to FIG. 11 together with FIG. 10, each of the light emitting pixels OSP arranged on the organic light emitting display surface DA1 includes a light emitting element LEL and at least one of the pixel drivers DP1 through DPn.

Each of the light emitting elements LEL may be connected in parallel to at least one of the pixel drivers DP1 through DPn. Each of the light emitting elements LEL may emit light in response to driving currents simultaneously input from the pixel drivers DP1 through DPn . . . . For example, each light emitting element LEL may emit light in response to driving currents simultaneously input from respective pixel drivers (e.g., pixel driver DP1, pixel driver DPn) electrically coupled to the light emitting element LEL.

The pixel drivers DP1 through DPn receive the same gate control signals and analog emission control voltage through the emission driving circuit 120 and the first gate driver 111 and drive the light emitting element LEL connected in parallel thereto according to the same driving timing in units of at least one frame.

Each of the pixel drivers DP1 through DPn for each light emitting pixel OSP may include a driving transistor DT, an $i^{th}$ transistor STi, a $j^{th}$ transistor STj, and a capacitor voltage supply terminal Cp.

The driving transistor DT of each of the pixel drivers DP1 through DPn may include a gate electrode, a first electrode, and a second electrode. The driving transistor DT controls a drain-source current Ids (hereinafter, referred to as a "driving current") flowing between the first electrode and the second electrode based on a capacitor voltage applied to the gate electrode. The driving current Ids flowing through a channel of the driving transistor DT is proportional to the square of a difference between a voltage Vgs between the first electrode and the gate electrode of the driving transistor DT and a threshold voltage.

The capacitor voltage is an analog emission control voltage inputted through the capacitor voltage supply terminal Cp, and the size of the capacitor voltage may be preset according to the magnitude of the analog emission control voltage and the capacitor magnitude of the capacitor voltage supply terminal Cp.

The $i^{th}$ transistor STi is turned on by the display scan signal at the display scan line GL to connect the gate electrode and the second electrode of the driving transistor DT. For example, in the on state, $i^{th}$ transistor STi connects the gate electrode and the second electrode of the driving transistor DT. When the gate electrode and the second electrode of the driving transistor DT are connected, the driving transistor DT is driven as a diode. The gate electrode of the $i^{th}$ transistor STi may be connected to the display scan line GL, the first electrode may be connected to the second electrode of the driving transistor DT, and the second electrode may be connected to the gate electrode of the driving transistor DT.

The $j^{th}$ transistor STj is disposed between the second electrode of the driving transistor DT and the anode electrode of the light emitting element LEL. The $j^{th}$ transistor STj is turned on by the emission control signal of the emission control line VL to connect the second electrode of the driving transistor DT to the anode electrode of the light emitting element LEL. For example, in the on state, $j^{th}$ transistor STj connects the second electrode of the driving transistor DT to the anode electrode of the light emitting element LEL. The $j^{th}$ transistor STj may have a gate electrode connected to the emission control line VL, the first electrode connected to the second electrode of the driving transistor DT, and the second electrode connected to the anode electrode of the light emitting element LEL.

The light emitting element LEL emits light based on the driving currents Ids simultaneously supplied through at least one of the pixel drivers DP1 through DPn. For example, for a case in which the display device 200 simultaneously supplies driving currents Ids to pixel driver DP1 through pixel driver DPn of the light emitting element LEL, the light emitting element LEL emits light based on the driving currents Ids. As the driving currents Ids supplied in parallel from the pixel drivers DP1 through DPn increase, the amount of light emitted from the light emitting element LEL may increase.

Figure 12:
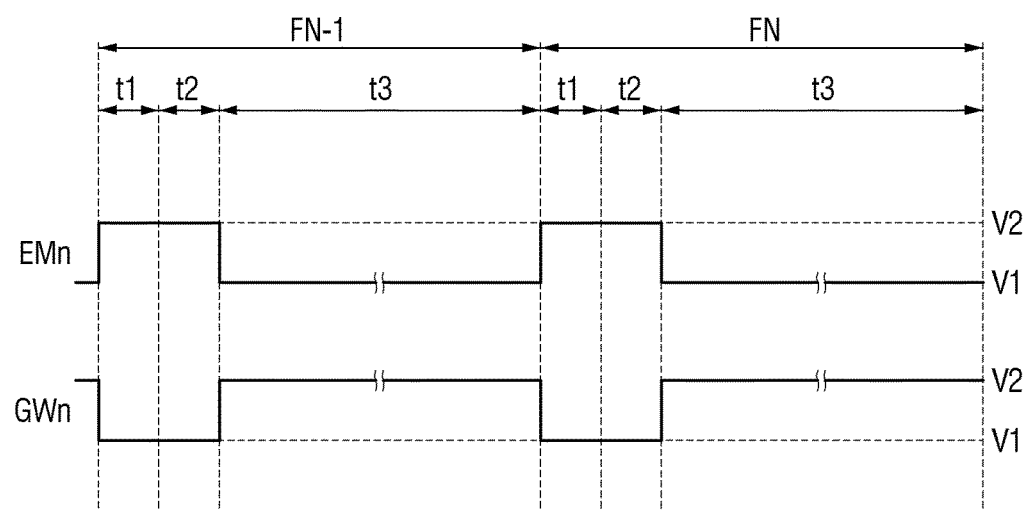
FIG. 12 is a waveform diagram of scan control signals simultaneously supplied to a plurality of light emitting elements shown in FIG. 11.

FIG. 12 is a waveform diagram of scan control signals simultaneously supplied to a plurality of light emitting elements LEL shown in FIGS. 8 and 11.

FIG. 12 illustrates examples of scan control signals in accordance with example aspects of the present disclosure. In an example, the scan control signals may include an emission control signal EMn transmitted to the emission control line VL during an $(N-1)^{th}$ frame period FN−1 and an $N^{th}$ frame period FN and a display scan signal GWn transmitted to the display scan line GSL.

The display scan signal GWn is a signal for controlling on-off of the $i^{th}$ transistor STi of each of the pixel drivers DP1 through DPn. The emission control signal EMn is a signal for controlling on-off of the $j^{th}$ transistor STj of each of the pixel drivers DP1 through DPn.

Each of the $(N-1)^{th}$ frame period FN−1 and the $N^{th}$ frame period FN may include a first period t1, a second period t2, and a third period t3.

The first and second periods t1 and t2 are periods in which the display device 200 supplies a capacitor voltage (CapV) to the capacitor voltage supply terminal Cp, and accordingly, to the gate electrode of the driving transistor DT and the threshold voltage of the driving transistor DT is sampled, and the third period t3 is a period in which the light emitting element LEL emits light based on a gate voltage of the driving transistor DT.

The display scan signal GWn is of a first-level voltage V1 during the first and second periods t1 and t2, and is of a second-level voltage V2 during the third period t3.

The emission control signal EMn is of a second-level voltage V2 during the first and second periods t1 and t2, and is of a first-level voltage V1 during the third period t3.

The first-level voltage V1 may be a turn-on voltage that can turn on the $i^{th}$ and $j^{th}$ transistors STi and STj. The second-level voltage V2 may be a turn-off voltage that can turn off the $i^{th}$ and $j^{th}$ transistors STi and STj. The second-level voltage V2 may be higher than the first-level voltage V1.

During the first and second periods t1 and t2, the display device 200 may supply the display scan signal GWn of the first-level voltage V1 to the display scan line GSL. Therefore, during the first and second periods t1 and t2, the $i^{th}$ transistor STi is turned on by the display scan signal GWn of the first-level voltage V1.

During the third period t3, the display device 200 may supply the emission control signal EMn of the first-level voltage V1 to the emission control line. During the third period t3, the $j^{th}$ transistor STj is turned on by the emission control signal EMn of the first level voltage V1. When the $j^{th}$ transistor STj is turned on, the driving current Ids flowing based on the voltage of the gate electrode of the driving transistor DT may be supplied to the light emitting element LEL.

Figure 13:
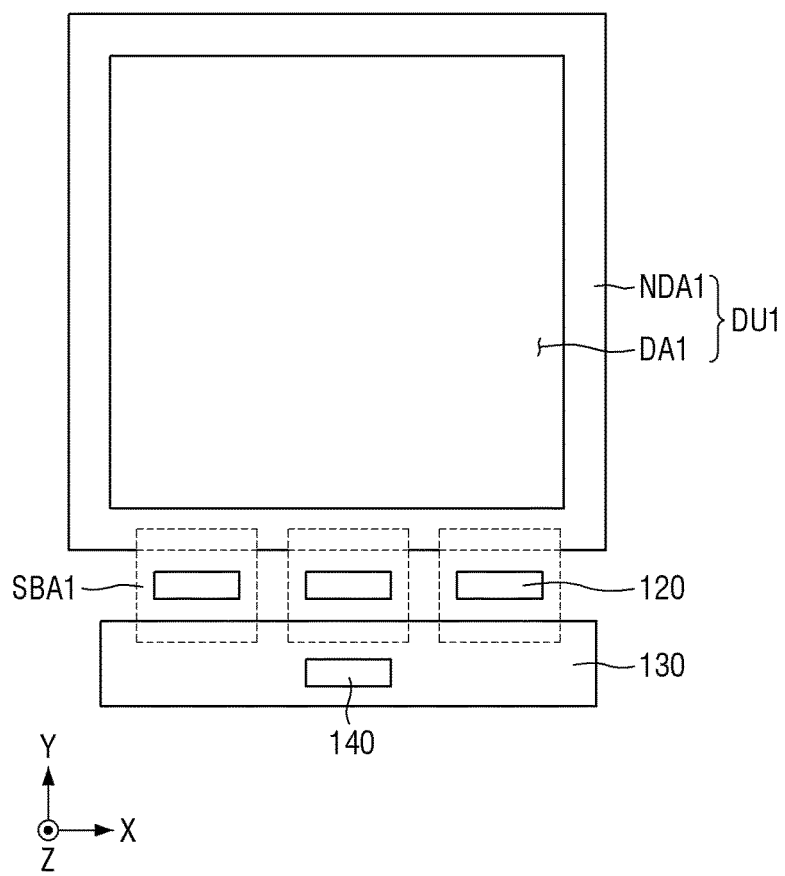
FIG. 13 is a plan view of the second embodiment specifically illustrating the surface light source device illustrated in FIG. 3.

FIG. 13 is a plan view of the second embodiment specifically illustrating the surface light source device 110 illustrated in FIG. 3. In some aspects, FIG. 14 is a plan view of the second embodiment specifically illustrating the surface light source device 110 illustrated in FIG. 4.

Figure 14:
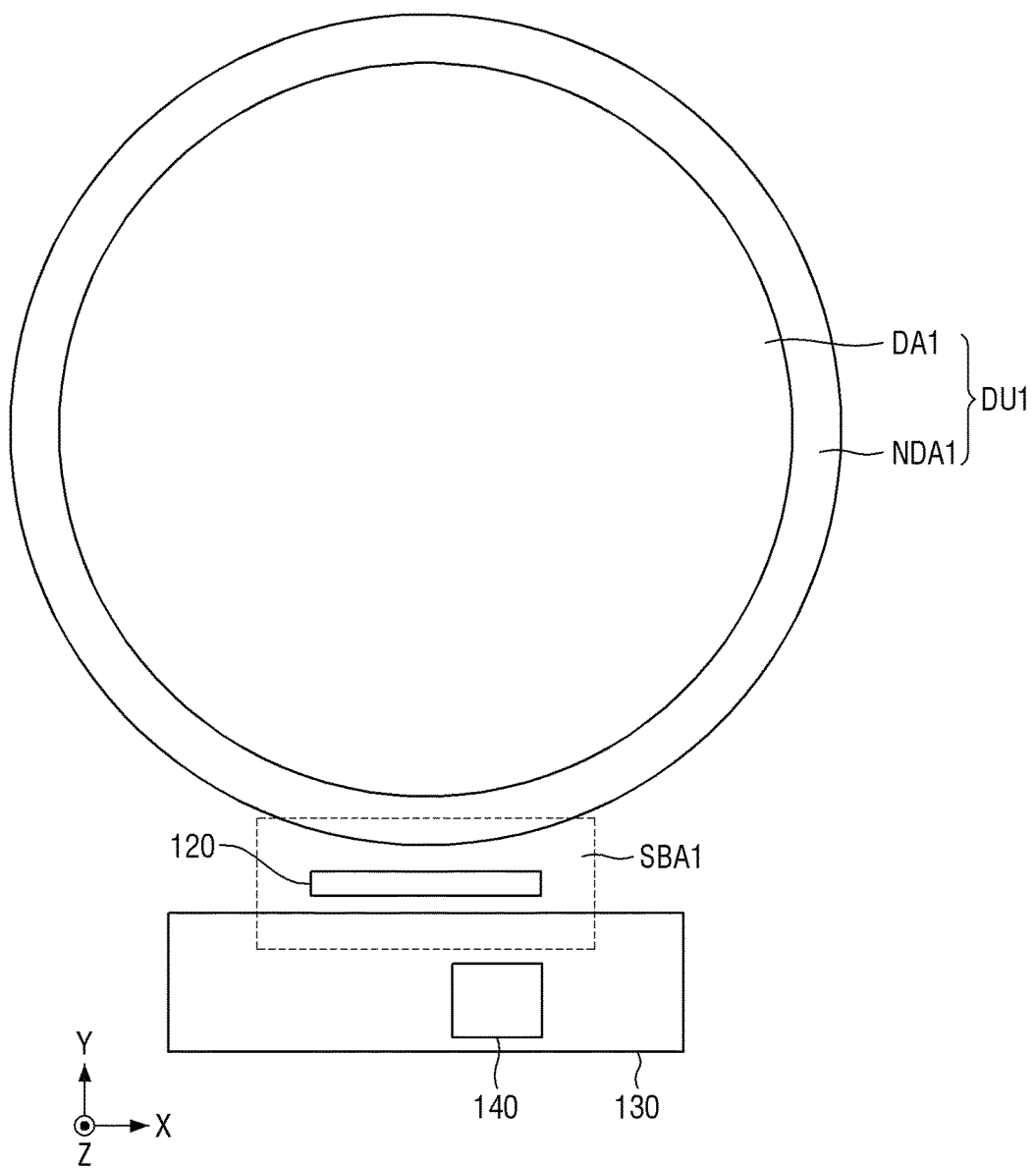
FIG. 14 is a plan view of the second embodiment specifically illustrating the surface light source device illustrated in FIG. 4.

Referring to FIGS. 13 and 14, the gate driver 111 may not be separately formed in the first non-display area NDA1, and the gate driver 111 may be integrally formed with the emission driving circuit 120. That is, for example, the gate driver 111 may be formed in a one-chip form with the emission driving circuit 120. Accordingly, for example, the at least one emission driving circuit 120 may simultaneously supply a plurality of scan control signals for simultaneously driving the light emitting pixels OSP to the entire light emitting pixels OSPs. In some aspects, the emission driving circuit 120 may output an analog emission control voltage for simultaneously driving the light emitting pixels OSP to each of the data lines DL through the fan-out lines. For example, referring to FIG. 13, each of the emission driving circuits 120 may output an analog emission control voltage for simultaneously driving one or more light emitting pixels OSP, to each of the data lines DL through the fan-out lines. Referring to FIG. 14, the emission driving circuit 120 may output an analog emission control voltage for simultaneously driving the light emitting pixels OSP, to each of the data lines DL through the fan-out lines. The analog emission control voltage(s) may be supplied to the light emitting pixels OSP, and luminances of the light emitting pixels OSP may be based on the analog emission control voltages.

Figure 15:
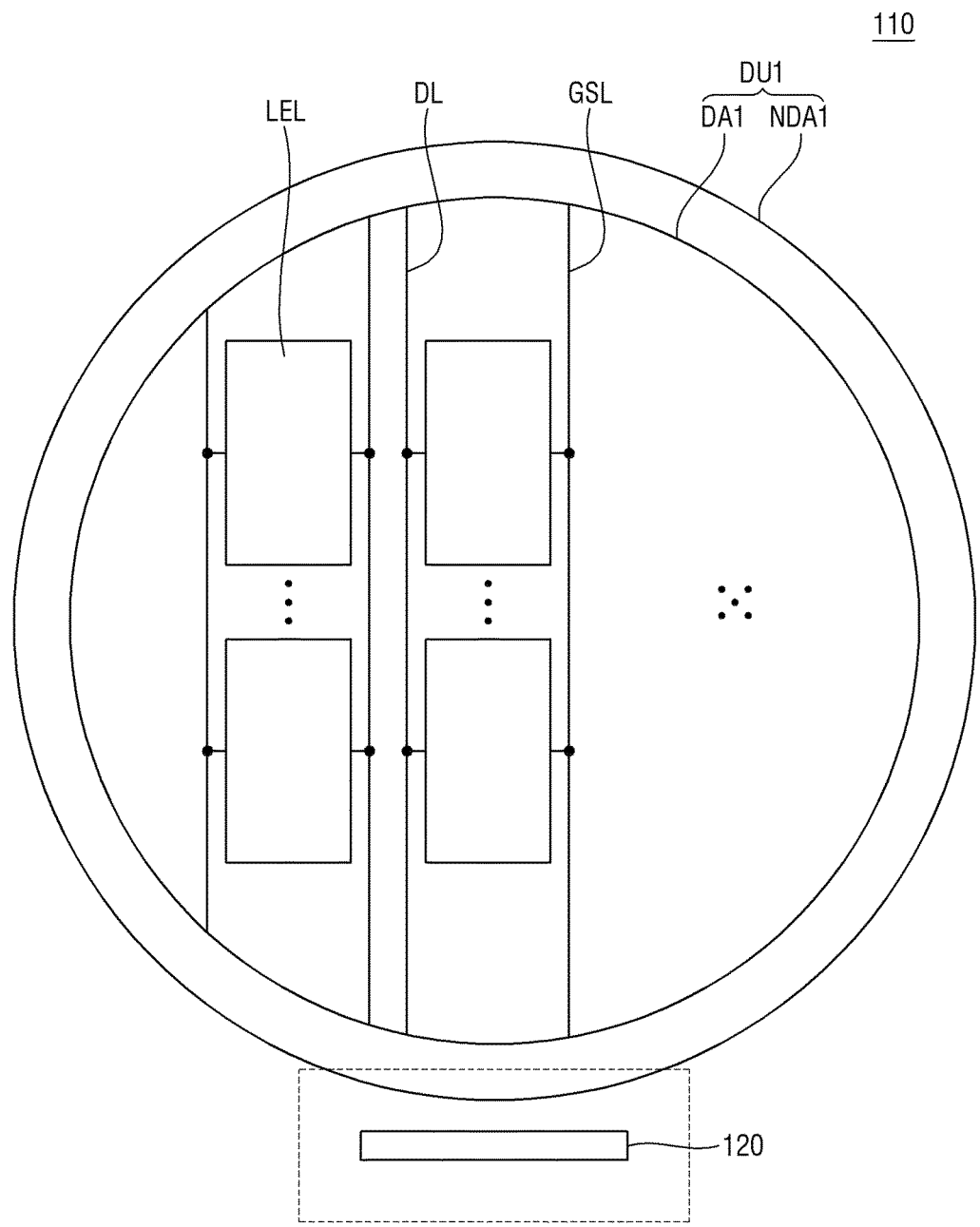
FIG. 15 is a plan view schematically illustrating the structure of an organic light emitting display surface of the surface light source device illustrated in FIG. 14.
Figure 16:
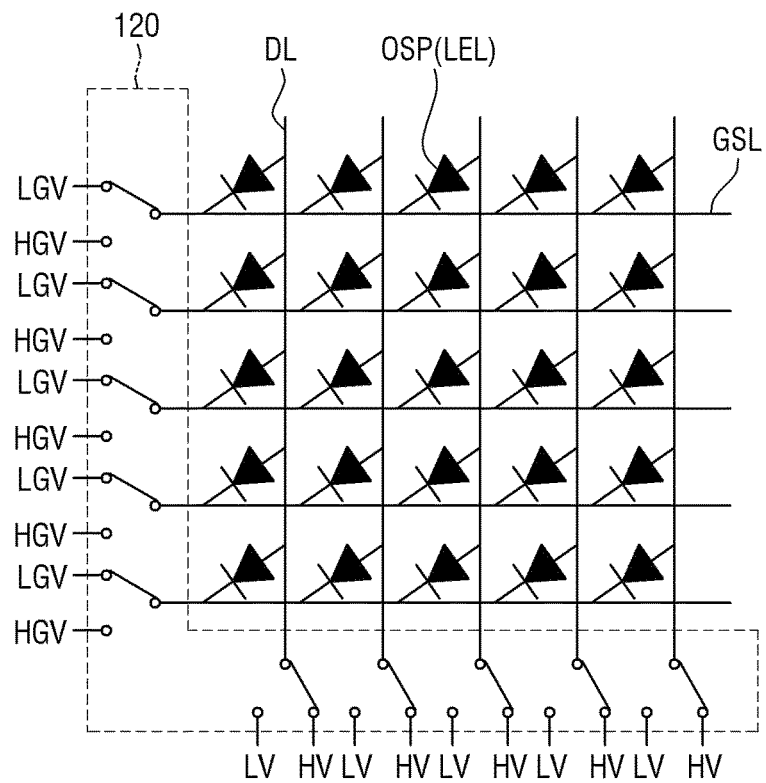
FIG. 16 is a circuit diagram of the first embodiment specifically illustrating the circuit structure of light emitting pixels arranged on an organic light emitting display surface of FIG. 15.

FIG. 15 is a plan view schematically illustrating the structure of an organic light emitting display surface of the surface light source device 110 illustrated in FIG. 14. In some aspects, FIG. 16 is a circuit diagram of the first embodiment specifically illustrating the circuit structure of light emitting pixels OSP arranged on an organic light emitting display surface of FIG. 15.

Referring to FIGS. 14 and 15, the light emitting pixels OSP may be arranged on the organic light emitting display surface DA1 in a matrix form in vertical and horizontal stripe directions. That is, for example, the light emitting pixels OSP may be arranged in a matrix including rows and columns of light emitting pixels OSP. Each of the light emitting pixels OSP includes at least one light emitting element LEL. For each light emitting element LEL, a first electrode of the light emitting element LEL is connected to each data line DL and a second electrode of the light emitting element LEL is connected to each display scan line GSL. In other words, each light emitting element LEL constitutes one light emitting pixel OSP, and the first electrode, which is an input electrode of each light emitting element LEL, is connected to each data line DL. The second electrode, which is an output electrode of each light emitting element LEL, may be connected to each display scan line GSL.

The emission driving circuit 120 may selectively supply high-potential or low-potential emission control voltages HV or LV to at least one data line DL among a plurality of data lines DL arranged in parallel with each other in a vertical direction or a horizontal direction.

The emission driving circuit 120 may selectively supply high-potential or low-potential scan control voltages HGV or LGV to at least one display scan line GSL among a plurality of display scan lines GSL arranged in parallel with each other in a vertical direction or a horizontal direction.

The high-potential emission control voltage HV and the high-potential scan control voltage HGV may be driving voltages of the light emitting elements LEL enabling the light emitting elements LEL to emit light. In some embodiments, the high-potential emission control voltage HV and the high-potential scan control voltage HGV may be positive polarity voltages of about 5V or more. In some embodiments, the low-potential emission control voltage LV and the low-potential scan control voltage LGV may be ground voltages and may be voltages of about 0V. In some embodiments, the low-potential emission control voltage LV and the low-potential scan control voltage LGV may be negative polarity voltages of about negative 5V or more (e.g., negative 5.1V or the like).

The emission driving circuit 120 selectively supplies high-potential or low-potential emission control voltages HV or LV to the plurality of data lines DL to provide high-potential or low-potential emission control voltages HV or LV to the first electrodes of the light emitting elements LEL. Further, for example, the emission driving circuit 120 selectively supplies high-potential or low-potential scan control voltages HGV or LGV to the plurality of display scan lines GSL to provide high-potential or low-potential scan control voltages HGV or LGV to the second electrodes of the light emitting elements LEL.

The emission driving circuit 120 may selectively supply high-potential or low-potential emission control voltages HV or LV to the plurality of data lines DL by using an internal switching circuit structure. In some aspects, the emission driving circuit 120 may selectively supply high-potential or low-potential scan control voltages HGV or LGV to the plurality of display scan lines GSL by using the internal switching circuit structure.

The light emitting elements LEL, based on a high-potential emission control voltage HV input to respective first electrodes through a plurality of data lines DL and a low-potential scan control voltage LGV input to respective second electrodes through a plurality of display scan lines GSL, may selectively emit light.

The light emitting elements LEL may be connected in a diode structure. For example, each light emitting element LEL may be a light-emitting diode (LED) that emits light when a current flows through the light emitting element LEL. Accordingly, for example, the light emitting elements LEL to which the low-potential emission control voltage LV is applied to respective first electrodes through the plurality of data lines DL may not emit light. In some aspects, the light emitting elements LEL to which the high-potential scan control voltage HGV is applied to respective second electrodes through the plurality of display scan lines GSL may not emit light. In accordance with example aspects of the present disclosure, the light emitting elements LEL to which the high-potential emission control voltage HV is input to respective first electrodes through a plurality of data lines DL and the low-potential scan control voltage LGV is input to respective second electrodes through a plurality of display scan lines GSL may selectively emit light.

Figure 17:
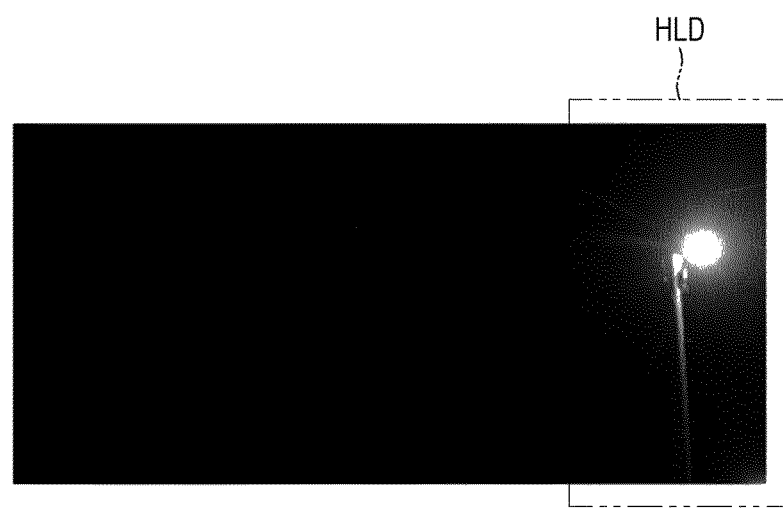
FIG. 17 is a diagram showing a display image displayed on the spatial light modulator.
Figure 18:
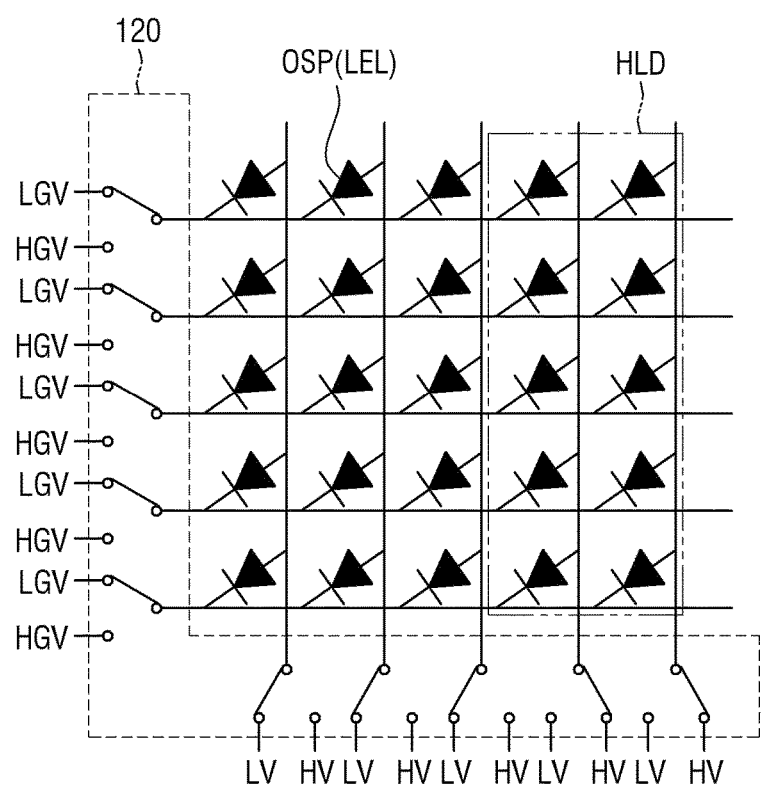
FIG. 18 is a circuit diagram showing a method of controlling light emission driving for each emission area of the light emitting pixels shown in FIG. 16.

FIG. 17 is a diagram showing a display image displayed on the spatial light modulator 210 described herein. FIG. 18 is a circuit diagram showing a method of controlling light emission driving for each emission area of the light emitting pixels OSP shown in FIG. 16.

Referring to FIG. 17, the emission driving circuit 120 divides image data input from the outside into at least one frame unit and analyzes a gradation value or luminance value for each pixel data of at least one frame of the image data. The term "each pixel data" may refer to respective pixel data of each light emitting pixel OSP. The emission driving circuit 120 may analyze a gradation value or luminance value for respective pixel data of each light emitting pixel OSP, for at least one frame of the image data.

The emission driving circuit 120 analyzes and sets at least one emission area HLD for rear surface emission (e.g., an emission area HLD targeted or required for rear surface emission) according to an arrangement position of a gradation value or a luminance value for each pixel data of image data. The emission driving circuit 120 may set the remaining area (e.g., the area different from the at least one emission area HLD set for rear surface emission) as a blackened area of low gray level.

The emission driving circuit 120 distinguishes and sets the position of the organic light emitting display surface DA1 of the surface light source device 110 corresponding to the position of the emission area HLD, that is, the emission area HLD of the organic light emitting display surface DA1.

The emission driving circuit 120 selectively supplies a high-potential emission control voltage HV to the plurality of data lines DL disposed at positions or areas corresponding to the emission area HLD of the organic light emitting display surface DA1. The emission driving circuit 120 supplies the low-potential scan control voltage LGV to the plurality of display scan lines GSL disposed to correspond to or overlap with the emission area HLD of the organic light emitting display surface DA1. Accordingly, the light emitting elements LEL to which the high-potential emission control voltage HV is input to the respective first electrodes through the plurality of data lines DL and the low-potential scan control voltage LGV is input to the respective second electrodes through the plurality of display scan lines GSL selectively emit light. That is, the emission driving circuit 120 may selectively emit light from the light emitting elements LEL disposed at positions or areas corresponding to the emission area HLD of the organic light emitting display surface DA1.

The emission driving circuit 120 may selectively supply the low-potential emission control voltage LV to the plurality of data lines DL corresponding to or overlapping the remaining areas that do not correspond to or overlap with the emission area HLD of the organic light emitting display surface DA1, that is, the blackened area of low gray level. In some aspects, the high-potential scan control voltage HGV may be supplied to the plurality of display scan lines GSL corresponding to or overlapping with the blackened area of low gray level. Accordingly, for example, the light emitting elements LEL disposed in the blackened area of low gray level may not emit light.

Figure 19:
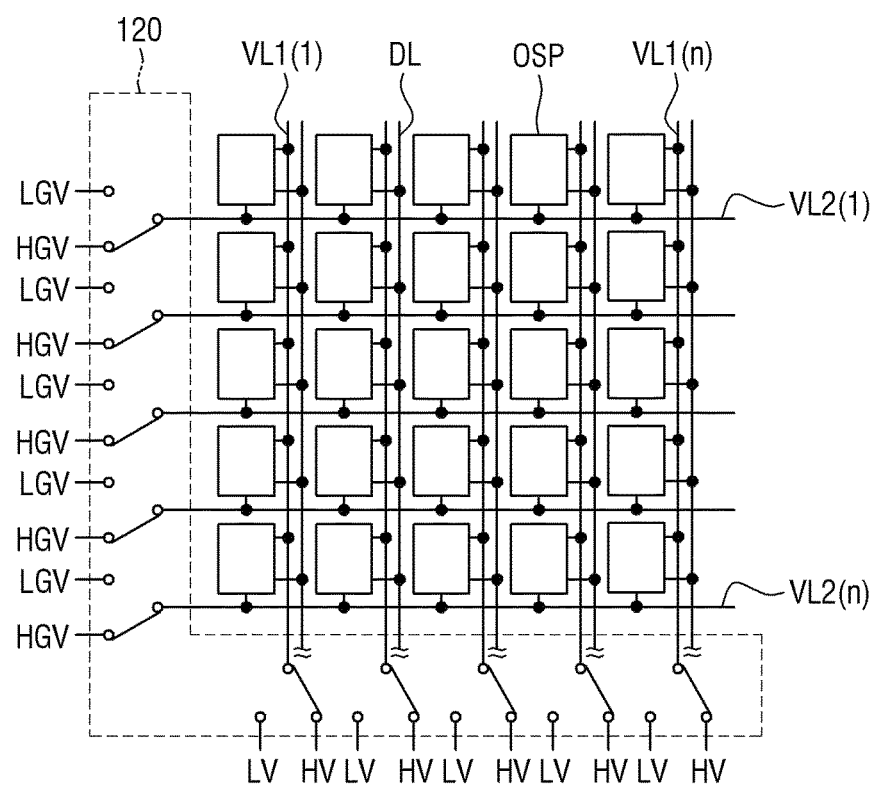
FIG. 19 is a circuit diagram of the second embodiment specifically illustrating the circuit structure of light emitting pixels arranged on an organic light emitting display surface of FIG. 15.
Figure 20:
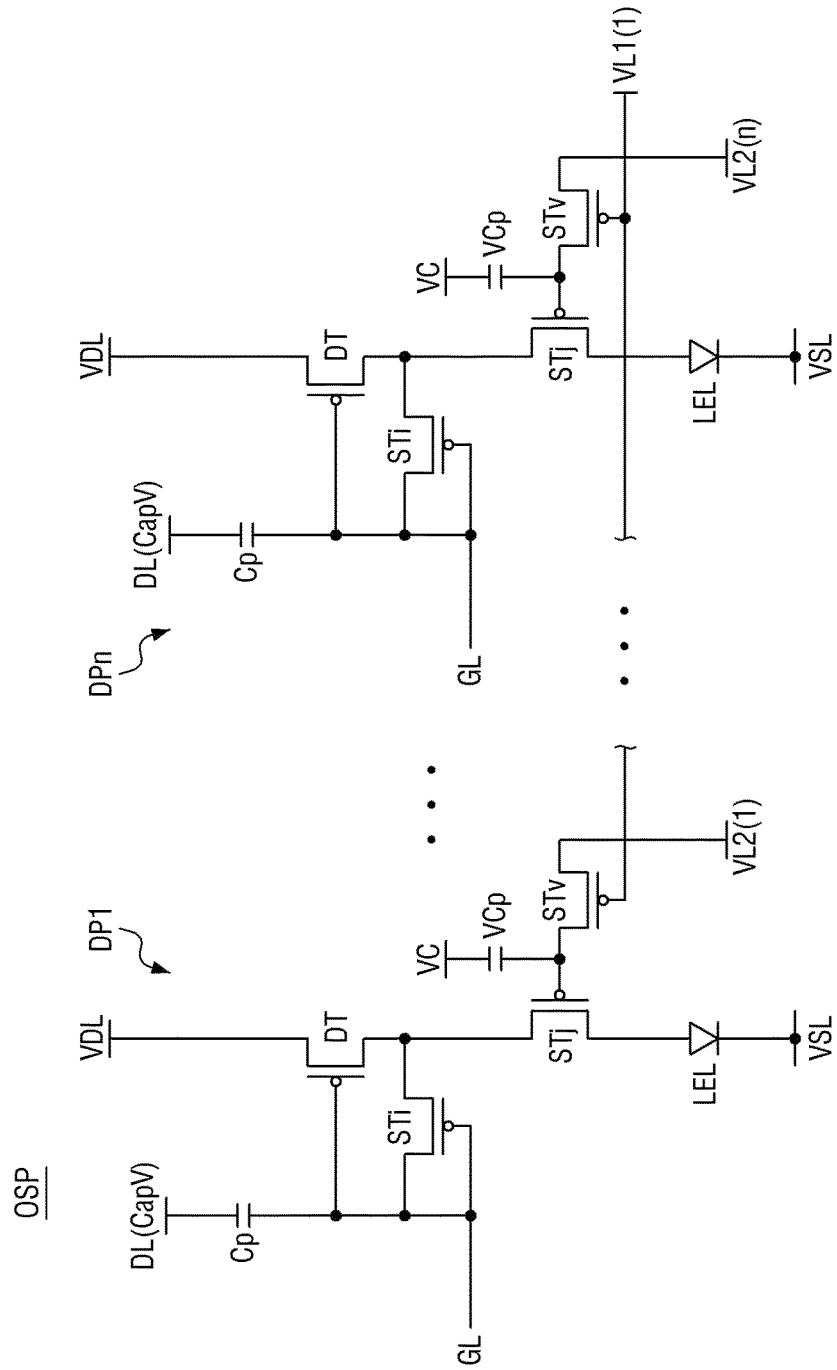
FIG. 20 is a circuit diagram of the first embodiment illustrating the circuit structure of light emitting pixels illustrated in FIG. 19.

FIG. 19 is a circuit diagram of the second embodiment specifically illustrating the circuit structure of light emitting pixels arranged on an organic light emitting display surface of FIG. 15. FIG. 20 is a circuit diagram of the first embodiment illustrating the circuit structure of light emitting pixels illustrated in FIG. 19.

Referring to FIGS. 19 and 20, each of the light emitting pixels OSP arranged on the organic light emitting display surface DA1 includes a light emitting element LEL and at least one of the pixel drivers DP1 through DPn.

Each of the light emitting elements LEL may be connected in parallel to at least one of the pixel drivers DP1 through DPn. Each of the light emitting elements LEL may emit light in response to driving currents simultaneously input from the pixel drivers DP1 through DPn. For example, each light emitting element LEL may emit light in response to driving currents simultaneously input from a respective pixel driver (e.g., pixel driver DP1, pixel driver DPn) electrically coupled to the light emitting element LEL.

Each of the pixel drivers DP1 through DPn for each light emitting pixel OSP may include a capacitor voltage supply terminal Cp, a driving transistor DT, an $i^{th}$ transistor STi, a $j^{th}$ transistor STj, and an emission control transistor Stv.

The driving transistor DT controls a drain-source current Ids (hereinafter, referred to as a "driving current") flowing between the first electrode and the second electrode based on a capacitor voltage applied to the gate electrode. The driving current Ids flowing through a channel of the driving transistor DT is proportional to the square of a difference between a voltage Vgs between the first electrode and the gate electrode of the driving transistor DT and a threshold voltage.

The capacitor voltage is an analog emission control voltage inputted through the capacitor voltage supply terminal Cp, and the size of the capacitor voltage may be preset based on the magnitude of the analog emission control voltage and the capacitor magnitude of the capacitor voltage supply terminal Cp.

The $i^{th}$ transistor STi is turned on by the display scan signal at the display scan line GL to connect the gate electrode and the second electrode of the driving transistor DT. For example, in the on state, $i^{th}$ transistor STi connects the gate electrode and the second electrode of the driving transistor DT. When the gate electrode and the second electrode of the driving transistor DT are connected, the driving transistor DT is driven as a diode.

The $j^{th}$ transistor STj is disposed between the second electrode of the driving transistor DT and the anode electrode of the light emitting element LEL. The $j^{th}$ transistor STj is turned on by the emission control signal VC input through the emission control transistor Stv to connect the second electrode of the driving transistor DT to the anode electrode of the light emitting element LEL. For example, in the on state, $j^{th}$ transistor STj connects the second electrode of the driving transistor DT to the anode electrode of the light emitting element LEL. The $j^{th}$ transistor STj may have a gate electrode connected to the emission control transistor Stv, the first electrode connected to the second electrode of the driving transistor DT, and the second electrode connected to the anode electrode of the light emitting element LEL.

The emission control transistor Stv supplies the emission control signal VC to the gate electrode of the $j^{th}$ transistor STj in response to the high-potential emission control voltage HV input through any one of the first emission control lines among a plurality of first emission control lines VL1-1 through VL1-$n$ and the scan control voltage HGV input through any one of the second emission control lines among a plurality of second emission control lines VL2-1 through VL2-$n$.

The first electrode of the emission control transistor Stv is connected to any one of the second emission control lines among a plurality of second emission control lines VL2-1 through VL2-$n$, and a gate electrode of the emission control transistor Stv is connected to any one of the first emission control lines among the plurality of first emission control lines VL1-1 through VL1-$n$. The second electrode of the emission control transistor Stv is connected to the gate electrode of the $j^{th}$ transistor STj.

An emission control signal VC input terminal including an emission control capacitor VCp in a parallel structure with the gate electrode of the $j^{th}$ transistor STj may be additionally disposed at the second electrode of the emission control transistor Stv.

The emission driving circuit 120 selectively supplies high-potential or low-potential emission control voltages HV or LV to the plurality of first emission control lines VL1-1 through VL1-$n$ to supply high-potential or low potential emission control voltages HV or LV to the gate electrodes of the emission control transistor Stv. For example, the emission driving circuit 120 selectively supplies high-potential or low-potential emission control voltages HV or LV to the gate electrodes of the emission control transistor Stv, through the plurality of first emission control lines VL1-1 through VL1-$n$. Further, for example, the emission driving circuit 120 selectively supplies high-potential or low-potential scan control voltages HGV or LGV to the plurality of second emission control lines VL2-1 through VL2-$n$ to supply high-potential or low-potential scan control voltages HGV or LGV to the second electrodes of the emission control transistors Stv. For example, the emission driving circuit 120 selectively supplies the high-potential or low-potential scan control voltages HGV or LGV to the second electrodes of the emission control transistors Stv, via the plurality of second emission control lines VL2-1 through VL2-n.

The emission driving circuit 120 selectively supplies the high-potential or low-potential emission control voltages HV or LV to the plurality of first emission control lines VL1-1 through VL1-n by using an internal switching circuit structure. In some aspects, the emission driving circuit 120 selectively supplies the high-potential or low-potential scan control voltages HGV or LGV to the plurality of second emission control lines VL2-1 through VL2-n by using the internal switching circuit structure.

When the high-potential emission control voltage HV is input to the gate electrodes through any one of the first emission control lines VL1-1 through VL1-n, and the high-potential scan control voltage HGV is input to the first electrodes of the emission control transistors Stv through any one of the second emission control lines VL2-1 through VL2-n, the emission control transistors Stv are turned on and supply the emission control signal VC to the gate electrode of the $j^{th}$ transistor STj. For example, for a given pixel driver (e.g., pixel driver DP1), when the high-potential emission control voltage HV is input to a gate electrode of an emission control transistor Stv through a first emission control line VL1 (e.g., any one of first emission control lines VL1-1 through VL1-n), and the high-potential scan control voltage HGV is input to a first electrode of the emission control transistor Stv through a second emission control line VL2 (e.g., any one of the second emission control lines VL2-1 through VL2-n), the emission control transistor Stv is turned on and supplies the emission control signal VC to the gate electrode of the $j^{th}$ transistor STj.

As described above, the emission driving circuit 120 distinguishes and sets the position of the organic light emitting display surface DA1 of the surface light source device 110 corresponding to the position of the emission area HLD by analyzing and setting the image data, that is, the emission area HLD of the organic light emitting display surface DA1.

The emission driving circuit 120 selectively supplies the high-potential emission control voltage HV to the first emission control lines VL1-1 through VL1-n disposed at positions or areas corresponding to the emission area HLD of the organic light emitting display surface DA1. The high-potential scan control voltage HGV is also supplied to the second emission control lines VL2-1 through VL2-n disposed to correspond to or overlap with the emission area HLD of the organic light emitting display surface DA1. Accordingly, for example, the high-potential emission control voltage HV is input to the gate electrode through any one of the first emission control lines VL1-1 through VL1-n, and the emission control transistors Stv to which the high-potential scan control voltage HGV is applied to the first electrode through any one of the second emission control lines VL2-1 through VL2-n, thereby supplying the emission control signal VC to the gate electrode of the $j^{th}$ transistor STj.

The emission driving circuit 120 may selectively supply the low-potential emission control voltage LV to the remaining areas that do not correspond to or overlap with the emission area HLD of the organic light emitting display surface DA1, that is, the first emission control lines VL1-1 through VL1-n corresponding to or overlapping with the blackened area of low gray level. In some aspects, the low-potential scan control voltage LGV may be supplied to the second emission control lines VL2-1 through VL2-n corresponding to or overlapping with the blackened area of low gray level. Accordingly, the light emitting elements LEL disposed in the blackened area of low gray level may not emit light.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense and not for purposes of limitation.

What is claimed is:

1. A display device comprising:
   at least one spatial light modulator displaying an extended reality content image;
   a surface light source device providing image display light from a rear direction of the at least one spatial light modulator to the at least one spatial light modulator as background light; and
   at least one image transmission member forming a display path of the extended reality content image,
   wherein the surface light source device comprises:
      an organic light emitting display unit comprising a plurality of light emitting pixels performing a surface emission; and
      an emission driving circuit supplying an emission control voltage and each of scan timing control signals to the plurality of light emitting pixels to control a light emitting operation of the plurality of light emitting pixels.

2. The display device of claim 1,
   wherein the plurality of light emitting pixels comprise:
      a plurality of pixel drivers receiving scan timing control signals according to a same timing; and
      light emitting elements emitting light based on one or more driving currents by at least one pixel driver among the plurality of pixel drivers,
   wherein the plurality of pixel drivers receive the scan timing control signals and the emission control voltage according to a same timing such that the light emitting elements emit light simultaneously.

3. The display device of claim 2,
   wherein the light emitting elements are formed on an organic light emitting display surface of the organic light emitting display unit in one or more of a sector shape, a triangular shape, a rhombus shape, a quadrangular shape, a circular shape, a semicircular shape, and an elliptical shape.

4. The display device of claim 2,
   wherein the plurality of pixel drivers comprise:
   a driving transistor controlling a driving current applied by the driving transistor to at least one light emitting element among the light emitting elements;
   a first transistor connecting a gate electrode of the driving transistor to a first driving voltage line by being turned on by an initialization scan signal among the scan timing control signals;
   a second transistor connecting a first electrode of the driving transistor to a data line by being turned on by a display scan signal among the scan timing control signals;
   a third transistor connecting the driving transistor in a diode structure by being turned on by the display scan signal;
   a fourth transistor connecting an anode electrode of the at least one light emitting element to the first driving voltage line by being turned on by a display control signal among the scan timing control signals;

a fifth transistor connecting a first electrode of the driving transistor to a second driving voltage line by being turned on by an emission control signal among the scan timing control signals; and a sixth transistor connecting a second electrode of the driving transistor to an anode electrode of the at least one light emitting element by being turned on by the emission control signal.

5. The display device of claim 4,
wherein the emission driving circuit supplies an initialization scan signal among the scan timing control signals to the plurality of pixel drivers simultaneously according to a same timing during at least one frame, supplies the display scan signal according to a same timing to the plurality of pixel drivers, supplies the display control signal according to a same timing to the plurality of pixel drivers, and supplies the emission control signal according to a same timing to the plurality of pixel drivers.

6. The display device of claim 1,
wherein the plurality of light emitting pixels comprise:
a plurality of pixel drivers receiving the scan timing control signals according to a same timing; and
light emitting elements emitting light based on one or more driving currents by at least one pixel driver among the plurality of pixel drivers,
wherein the plurality of pixel drivers comprise:
a driving transistor controlling a driving current supplied by the driving transistor to at least one light emitting element among the light emitting elements;
an i-th transistor connecting a gate electrode of the driving transistor and a second electrode in a diode structure by being turned on by a display scan signal among the scan timing control signals;
a j-th transistor connecting a second electrode of the driving transistor to an anode electrode of the at least one light emitting element by being turned on by an emission control signal among the scan timing control signals; and
a capacitor voltage supply terminal supplying a capacitor voltage based on the emission control voltage to a gate electrode of the driving transistor.

7. The display device of claim 6,
wherein the emission driving circuit supplies the display scan signal among the scan timing control signals to the plurality of pixel drivers simultaneously according to the same timing during at least one frame period, and supplies the emission control signal to the plurality of pixel drivers according to a same timing.

8. The display device of claim 1,
wherein the plurality of light emitting pixels are arranged in a matrix shape of vertical and horizontal stripe directions in the organic light emitting display unit, and
wherein each light emitting pixel of the plurality of light emitting pixels comprises at least one light emitting element, the at least one light emitting element comprising a first electrode connected to a data line of the display device and a second electrode connected to each display scan line of the display device.

9. The display device of claim 8,
wherein:
the emission driving circuit selectively supplies the emission control voltage to the at least one data line among a plurality of data lines arranged in parallel to each other in a vertical direction or a horizontal direction, wherein the emission control voltage is of a high-potential or a low-potential, and the emission driving circuit selectively supplies a scan control voltage to at least one display scan line among a plurality of display scan lines arranged in parallel to each other in the vertical direction or the horizontal direction, wherein the scan control voltage is of a second high-potential or a second low-potential.

10. The display device of claim 9,
wherein the emission driving circuit:
analyzes and sets at least one emission area for rear surface light emission based on a gradation value or a luminance value for each pixel data of image data,
distinguishes and sets an organic light emitting display surface of the organic light emitting display unit corresponding to a position of the at least one emission area,
selectively supplies the emission control voltage to the at least one data line disposed to correspond to or overlap the emission area of the organic light emitting display surface, wherein the emission control voltage is of the high-potential, and
selectively supplies the scan control voltage to the at least one display scan line disposed to correspond to or overlap the emission area of the organic light emitting display surface, wherein the scan control voltage is of the low-potential.

11. The display device of claim 9,
wherein at least one light emitting element included in the plurality of light emitting pixels emits light when a high-potential emission control voltage is applied to a first electrode of the at least one light emitting element through the data line and a low-potential scan control voltage is applied to a second electrode of the at least one light emitting element through the display scan line.

12. The display device of claim 1,
wherein the plurality of light emitting pixels comprise:
a plurality of pixel drivers receiving the emission control voltage and each of the scan timing control signals according to a same timing; and
light emitting elements emitting light based on one or more driving currents by at least one pixel driver among the plurality of pixel drivers,
wherein the plurality of pixel drivers comprise:
a driving transistor controlling a driving current supplied by the driving transistor to at least one light emitting element among the light emitting elements;
a capacitor voltage supply terminal supplying a capacitor voltage based on the emission control voltage to a gate electrode of the driving transistor;
an i-th transistor connecting a gate electrode of the driving transistor and a second electrode of the driving transistor in a diode structure by being turned on by a display scan signal among the scan timing control signals;
a j-th transistor connecting the second electrode of the driving transistor to an anode electrode of the at least one light emitting element by being turned on by an emission control signal among the scan timing control signals; and
an emission control transistor supplying the emission control signal to a gate electrode of the j-th transistor in response to an emission control voltage inputted through at least one first emission control line and a scan control voltage inputted through at least one second emission control line.

13. The display device of claim 12,
wherein the plurality of pixel drivers further comprise an emission control signal input terminal connected to a second electrode of the emission control transistor in a parallel structure with the gate electrode of the j-th transistor, and the emission control signal input terminal includes an emission control capacitor.

14. The display device of claim 12,
wherein:
the emission driving circuit selectively supplies the emission control voltage to the at least one first emission control line such that the emission control voltage is supplied to gate electrodes of the emission control transistor, wherein the emission control voltage is of a high-potential or a low-potential, and
the emission driving circuit selectively supplies a scan control voltage to at least one second emission control line such that the scan control voltage is supplied to a second electrode of the emission control transistor, wherein the scan control voltage is of a second high-potential or a second low-potential.

15. The display device of claim 12,
wherein the emission driving circuit:
analyzes and sets at least one emission area for rear surface light emission based on a gradation value or a luminance value for each pixel data of image data,
distinguishes and sets an organic light emitting display surface of the organic light emitting display unit corresponding to a position of the at least one emission area,
selectively supplies the emission control voltage to the at least one first emission control line disposed to correspond to or overlap the emission area of the organic light emitting display unit, wherein the emission control voltage is of a high-potential, and
selectively supplies the scan control voltage to the at least one second emission control line disposed to correspond to or overlap the emission area of the organic light emitting display surface, wherein the scan control voltage is of the high-potential.

16. A display device comprising:
at least one spatial light modulator displaying an extended reality content image;
a surface light source device providing image display light from a rear direction of the at least one spatial light modulator to the at least one spatial light modulator as background light; and
at least one image transmission member forming a display path of the extended reality content image,
wherein the surface light source device comprises:
an organic light emitting display unit comprising a plurality of light emitting pixels performing a surface light emission; and
an emission driving circuit controlling a light emitting operation of the plurality of light emitting pixels by supplying an emission control voltage and each of scan timing control signals to the plurality of light emitting pixels,
wherein the emission driving circuit supplies the scan timing control signals and the emission control voltage according to a same timing to the plurality of light emitting pixels such that the plurality of light emitting pixels are driven according to a same timing in at least one frame unit.

17. The display device of claim 16, wherein the plurality of light emitting pixels comprise:

a plurality of pixel drivers receiving the scan timing control signals according to a same timing; and
light emitting elements emitting light based on one or more driving currents by at least one pixel driver among the plurality of pixel drivers,
wherein the plurality of pixel drivers receive the scan timing control signals and the emission control voltage according to a same timing such that the light emitting elements emit light simultaneously.

18. The display device of claim 16,
wherein the plurality of light emitting pixels comprise:
a plurality of pixel drivers receiving the scan timing control signals according to a same timing; and
light emitting elements emitting light based on one or more driving currents by at least one pixel driver among the plurality of pixel drivers,
wherein the plurality of pixel drivers comprise:
a driving transistor controlling a driving current supplied by the driving transistor to at least one light emitting element among the light emitting elements;
an i-th transistor connecting a gate electrode of the driving transistor and a second electrode in a diode structure by being turned on by a display scan signal among the scan timing control signals;
a j-th transistor connecting a second electrode of the driving transistor to an anode electrode of the at least one light emitting element by being turned on by an emission control signal among the scan timing control signals; and
a capacitor voltage supply terminal supplying a capacitor voltage based on the emission control voltage to a gate electrode of the driving transistor.

19. The display device of claim 16,
wherein the plurality of light emitting pixels are arranged in a matrix shape of vertical and horizontal stripe directions in the organic light emitting display unit, and
wherein each light emitting pixel of the plurality of light emitting pixels comprises at least one light emitting element, the at least one light emitting element comprising a first electrode connected to a data line and a second electrode connected to each display scan line of the display device.

20. The display device of claim 16, wherein the plurality of light emitting pixels comprise:
a plurality of pixel drivers receiving the emission control voltage and each of the scan timing control signals according to a same timing; and
light emitting elements emitting light based on one or more driving currents by at least one pixel driver among the plurality of pixel drivers,
wherein the plurality of pixel drivers comprise:
a driving transistor controlling a driving current supplied by the driving transistor to at least one light emitting element among the light emitting elements;
a capacitor voltage supply terminal supplying a capacitor voltage based on the emission control voltage to a gate electrode of the driving transistor;
an i-th transistor connecting a gate electrode of the driving transistor and a second electrode of the driving transistor in a diode structure by being turned on by a display scan signal among the scan timing control signals;
a j-th transistor connecting the second electrode of the driving transistor to an anode electrode of the at least one light emitting element by being turned on by an emission control signal among the scan timing control signals; and an emission control transistor supplying the emission control signal to a gate electrode of the j-th transistor in response to an emission control voltage inputted through at least one first emission control line and a scan control voltage inputted through at least one second emission control line.

* * * * *